US012738687B2

(12) United States Patent
Miwa

(10) Patent No.: US 12,738,687 B2
(45) Date of Patent: Sep. 15, 2026

(54) HOUSING AND CONNECTOR

(71) Applicant: HIROSE ELECTRIC CO., LTD., Kanagawa (JP)

(72) Inventor: Shinnosuke Miwa, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 344 days.

(21) Appl. No.: 18/658,228

(22) Filed: May 8, 2024

(65) Prior Publication Data

US 2024/0380160 A1 Nov. 14, 2024

(30) Foreign Application Priority Data

May 12, 2023 (JP) ................................ 2023-079094

(51) Int. Cl.
*H01R 13/627* (2006.01)
*H01R 13/516* (2006.01)

(52) U.S. Cl.
CPC ....... *H01R 13/6277* (2013.01); *H01R 13/516* (2013.01)

(58) Field of Classification Search
CPC ............. H01R 13/6277; H01R 13/516; H01R 4/185; H01R 13/4368; H01R 13/506; H01R 13/502; H01R 13/42; H01R 13/40; H01R 13/58; H01R 24/28
See application file for complete search history.

(56) References Cited

U.S. PATENT DOCUMENTS

| | | | | |
|---|---|---|---|---|
| 5,611,711 A * | 3/1997 | Okada | H01R 12/727 | 439/607.08 |
| 7,108,540 B2 * | 9/2006 | Annecke | H01R 13/639 | 439/352 |
| 7,147,503 B2 * | 12/2006 | Shindo | H01R 13/6277 | 439/942 |
| 7,344,403 B2 * | 3/2008 | Major | H01R 13/6271 | 439/352 |
| 12,580,327 B2 * | 3/2026 | Miwa | H01R 4/18 | |
| 2002/0081888 A1 * | 6/2002 | Regnier | H01R 13/6273 | 439/352 |

(Continued)

FOREIGN PATENT DOCUMENTS

JP 2017199497 A 11/2017

*Primary Examiner* — Abdullah A Riyami
*Assistant Examiner* — Nader J Alhawamdeh
(74) *Attorney, Agent, or Firm* — RANKIN, HILL & CLARK LLP

(57) ABSTRACT

Provided is a housing which includes: a housing portion; a cover portion; and an attachment structure, the attachment structure has an engagement groove provided in the housing portion and an engagement piece provided in the cover portion, the engagement groove has a first and a second inner end surface, the second inner end surface is positioned on a back side of the engagement groove, the engagement piece has a first and a second outer end surface, the second outer end surface is positioned on a back side of the engagement piece, the second inner end surface and the second outer end surface are an inner inclined surface inclined backward from up to down, and a lower portion of the inner inclined surface of the second inner end surface and a lower portion of the outer inclined surface of the second outer end surface contact each other.

7 Claims, 12 Drawing Sheets

(56) References Cited

U.S. PATENT DOCUMENTS

| | | | | |
|---|---|---|---|---|
| 2005/0020136 | A1* | 1/2005 | Johannes | H01R 13/6625 439/620.07 |
| 2006/0014413 | A1* | 1/2006 | Annecke | H01R 13/639 439/352 |
| 2017/0310036 | A1 | 10/2017 | Ono | |
| 2024/0145943 | A1* | 5/2024 | Miwa | H01R 4/18 |
| 2024/0380160 | A1* | 11/2024 | Miwa | H01R 13/6277 |

* cited by examiner

HOUSING AND CONNECTOR

CROSS-REFERENCE TO RELATED APPLICATION

This application claims priority from Japanese Patent Application No. 2023-079094 filed with the Japan Patent Office on May 12, 2023, the entire content of which is hereby incorporated by reference.

BACKGROUND

1. Technical Field

The present disclosure relates to a housing and a connector.

2. Related Art

There has been known a right angle connector formed in an L shape as viewed from the side (JP-A-2017-199497). This connector includes a plug housing supporting a plug terminal and a fixing portion fixing the plug terminal to the plug housing. The plug terminal includes a contact portion contacting a socket terminal and a swaging portion crimped to a power cable, and is formed in an L shape. The plug housing includes an insertion target portion into which the contact portion is inserted and a base on which the swaging portion and the power cable are arranged, and is formed in an L shape. The top and side surfaces of the base are provided with locking raised portions. Frames protrude from three sides of the fixing portion, and a locking hole is drilled in each frame. When the fixing portion is attached to the plug housing so as to cover the swaging portion and the power cable, each locking raised portion is locked to the locking hole. In this manner, the fixing portion is fixed to the plug housing.

SUMMARY

A housing according to the present disclosure is configured such that the housing includes: a housing portion; a cover portion; and an attachment structure, in which the housing portion has a housing chamber and a housing opening opened in an upper surface of the housing chamber, the cover portion is configured to be attachable to the housing portion so as to close the housing opening, the attachment structure has an engagement groove and an engagement piece, the engagement groove is recessed in either one of the housing portion or the cover portion on each side thereof in a right-left direction, the engagement piece is provided on each side of the other one of the housing portion or the cover portion in the right-left direction, and is configured to be fitted in the engagement groove in a state of the housing opening being closed with the cover portion, the engagement groove has a first inner end surface and a second inner end surface, the first inner end surface is positioned on a front side of the engagement groove, and the second inner end surface is positioned on a back side of the engagement groove, the engagement piece has a first outer end surface and a second outer end surface, the first outer end surface is positioned on a front side of the engagement piece, and the second outer end surface is positioned on a back side of the engagement piece, at least the second inner end surface of the first and second inner end surfaces is an inner inclined surface inclined backward from up to down, at least the second outer end surface of the first and second outer end surfaces is an outer inclined surface inclined backward from the up to the down, and in a state of the housing opening being closed with the cover portion, at least a lower portion of the inner inclined surface of the second inner end surface and a lower portion of the outer inclined surface of the second outer end surface contact each other.

DETAILED DESCRIPTION

Figure 1:
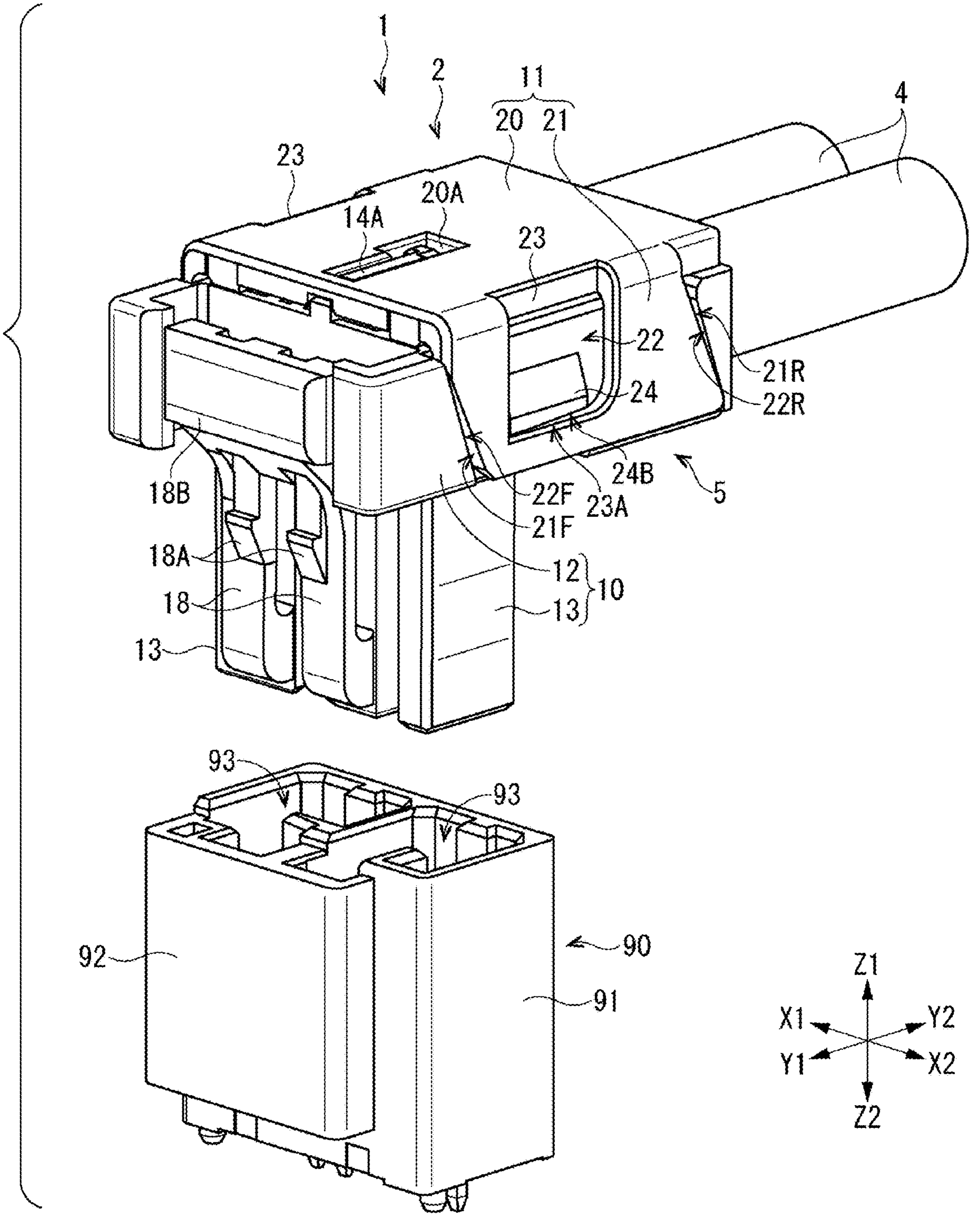
FIG. 1 is a perspective view showing a connector and a partner connector according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the above-described right angle connector, the right angle connector can be easily connected to a socket connector mounted on an electric board without forcibly bending the power cable. Moreover, the total height of the connector can be suppressed low.

For example, in a state of the connector being connected to the socket connector, a process of aligning the power cable or the like is performed in some cases. In this process, the power cable may be pulled in a direction (direction of separating from the connector) crossing the direction of extension of the power cable, e.g., because the power cable is carelessly caught by a hand. When the power cable is pulled, the fixing portion also turns with the top surface side of the base as a pivot point, and accordingly, the lower side of the fixing portion may be lifted from the plug housing. Depending on the magnitude of force of pulling the power cable, there is a probability that the fames on both right and left sides of the fixing portion are opened, each locking raised portion is detached from the locking hole, and the fixing portion is separated from the plug housing.

The present disclosure provides, in consideration of the above-described situation, a housing and a connector capable of reducing separation of a cover portion from a housing portion.

A housing according to the present disclosure includes: a housing portion; a cover portion; and an attachment structure, in which the housing portion has a housing chamber and a housing opening opened in an upper surface of the housing chamber, the cover portion is configured to be attachable to the housing portion so as to close the housing opening, the attachment structure has an engagement groove and an engagement piece, the engagement groove is recessed in either one of the housing portion or the cover portion on each side thereof in a right-left direction, the engagement piece is provided on each side of the other one of the housing portion or the cover portion in the right-left direction, and is configured to be fitted in the engagement groove in a state of the housing opening being closed with the cover portion, the engagement groove has a first inner end surface and a second inner end surface, the first inner end surface is positioned on a front side of the engagement groove, and the second inner end surface is positioned on a back side of the engagement groove, the engagement piece has a first outer end surface and a second outer end surface, the first outer end surface is positioned on a front side of the engagement piece, and the second outer end surface is positioned on a back side of the engagement piece, at least the second inner end surface of the first and second inner end surfaces is an inner inclined surface inclined backward from up to down, at least the second outer end surface of the first and second outer end surfaces is an outer inclined surface inclined backward from the up to the down, and in a state of the housing opening being closed with the cover portion, at least a lower portion of the inner inclined surface of the second inner end surface and a lower portion of the outer inclined surface of the second outer end surface contact each other.

In the housing of the present disclosure, the inner inclined surface of the engagement groove and the outer inclined surface of the engagement piece facing each other in back (other side in a first direction) in the front-back direction are inclined backward in the front-back direction from the up to the down (inclined to the other side in the first direction from the other side to one side in a second direction). When the cover portion closes the housing opening, at least the lower portions of the inner and outer inclined surfaces positioned in back contact each other. Note that backward in the front-back direction is the direction of extension of a crimp terminal and the direction of extension of a cable connected to the crimp terminal.

When the cable is pulled in a direction (direction of separating from the connector) crossing the direction of extension of the cable, the cover portion slightly turns with the vicinity (one end portion in the first direction) of a contact point between the outer and inner inclined surfaces positioned in front as a pivot point. However, according to the above-described configuration, the outer inclined surface of the engagement piece is pressed against the inner inclined surface of the engagement groove, and therefore, excessive turn of the cover portion 11 can be restricted and great lifting of a back portion (portion on the other side in the first direction) of the cover portion from the housing portion can be reduced. As a result, separation of the cover portion from the housing portion due to detachment of the engagement piece from the engagement groove can be reduced.

It is preferred that the attachment structure further has a latching hole and a latching claw, the latching hole is formed in either one of the engagement groove or the engagement piece, the latching claw protrudes from the other one of the engagement groove or the engagement piece, and in a state of the housing opening being closed with the cover portion, the latching claw is hooked on an edge portion of the latching hole.

According to the housing of the present disclosure, in a case where the housing opening is closed with the cover portion, the latching claw can be hooked on the edge portion of the latching hole in addition to contact between the inclined surfaces of the engagement piece and the engagement groove. With this configuration, the state of connection between the housing portion and the cover portion can be reinforced, and separation of the cover portion from the housing portion can be effectively reduced.

It is referred that the latching hole and the latching claw are hooked on each other at a position shifted forward with respect to a center of the engagement groove in a front-back direction.

According to the housing of the present disclosure, the latching hole and the latching claw are hooked on each other at the position closer to the front (one side in the first direction), and therefore, lifting of a front portion (portion on one side in the first direction) of the cover portion from the housing portion can be mainly effectively reduced.

It is preferred that either one of the edge portion of the latching hole or a latching surface of the latching claw to be hooked on the edge portion of the latching hole is inclined with respect to the other one of the edge portion or the latching surface such that a front portion of the edge portion of the latching hole and a front portion of the latching surface of the latching claw contact each other and a back portion of the edge portion of the latching hole and a back portion of the latching surface of the latching claw are apart from each other.

In a case where the entirety of the latching surface of the latching claw contacts the entirety of the edge portion of the latching hole, when the cable is pulled in a direction of separating from the connector, the cover portion slightly turns with the vicinity (one end portion in the first direction) of the contact point between the outer and inner inclined surfaces positioned in front as a pivot point. The latching surface is brought into a state of contacting only the back portion (portion on the other side in the first direction) of the edge portion of the latching hole and being apart from the front portion (portion on one side in the first direction) of the edge portion of the latching hole, i.e., a one-side contacting state.

When the cable is further pulled in this state, there is a probability that a lower edge portion of the latching hole is detached from the latching surface and moves over the latching claw.

On the other hand, in the housing of the present disclosure, the edge portion of the latching hole or the latching surface of the latching claw is inclined, and when the housing opening is closed with the cover portion, the latching surface contacts only the front portion (portion on one side in the first direction) of the edge portion of the latching hole. According to this configuration, when the cable is pulled and the cover portion slightly turns with the vicinity (one end portion in the first direction) of the above-described contact point as a pivot point, a state of the entirety of the latching surface contacting the entirety of the edge portion of the latching hole, i.e., an entirely-contacting state, is brought. With this configuration, even when the cable is further pulled, a state of the latching surface of the latching claw being firmly hooked on the edge portion of the latching hole can be held.

It is preferred that an inclination angle of the outer inclined surface of the engagement piece with respect to an up-down direction is greater than an inclination angle of the inner inclined surface of the engagement groove with respect to the up-down direction.

In the housing of the present disclosure, the inclination angle of the outer inclined surface of the engagement piece as viewed from the side is smaller than the inclination angle of the inner inclined surface of the engagement groove as viewed from the side. Thus, in a state of the engagement piece being fitted in (inserted into) the engagement groove, a tip end corner portion (outer inclined surface) of the back (other side in the first direction) of the engagement piece can be bitten into a lower portion (lower side) of the inner inclined surface positioned in back (other side in the first direction). With this configuration, the inner and outer inclined surfaces positioned in back (other side in the first direction) can be held in a contact state, and detachment of the engagement piece from the engagement groove can be reduced.

It is preferred that each of the first and second inner end surfaces of the engagement groove has the inner inclined surface, and the inner inclined surface of the first inner end surface and the inner inclined surface of the second inner end surface are formed parallel with each other, each of the first and second outer end surfaces of the engagement piece has the outer inclined surface, and the outer inclined surface of the first outer end surface and the outer inclined surface of the second outer end surface are formed parallel with each other, and when the housing opening is closed with the cover portion, the engagement piece enters the engagement groove while the outer inclined surface of the first outer end surface of the engagement piece is contacting an upper portion of the inner inclined surface of the first inner end surface of the engagement groove.

In the housing of the present disclosure, while the outer inclined surface positioned in front (one side in the first direction) is contacting the upper portion (portion on the other side in the second direction) of the inner inclined surface positioned in front (one side in the first direction), the engagement piece is fitted in the engagement groove.

According to this configuration, the engagement piece can be smoothly fitted in the engagement groove with the upper portion (portion on the other side in the second direction) of the inner inclined surface as a guide.

A connector according to the present disclosure includes: the housing described above; and a crimp terminal. The crimp terminal has a crimp portion and a terminal connection portion, and is housed in the housing chamber of the housing, the crimp portion is configured to extend backward, and be crimpable to a tip end portion of a cable, and the terminal connection portion is provided so as to extend downward from the crimp portion.

In the connector of the present disclosure, the housing and the crimp terminal are formed in a substantially L shape. Thus, for example, the connector can be easily connected to a partner connector mounted on an electric board without forcibly bending the cable. With this configuration, it is not necessary to expand a space where the connector and the partner connector are arranged more than necessary, and a device including the connector and the partner connector can be reduced in size.

According to the present disclosure, separation of the cover portion from the housing portion can be reduced.

Hereinafter, an embodiment of the present disclosure will be described with reference to the drawings. Note that X1, X2, Y1, Y2, Z1, and Z2 shown in each figure indicate left, right, front, back, up, and down, respectively. Moreover, a "front-back direction," an "up-down direction," and a "right-left direction" are examples of a "first direction," a "second direction," and a "third direction," respectively, and are perpendicular to each other.

In description below, the front (Y1 direction) and the back (Y2 direction) may be each referred to as one side in the first direction and the other side in the first direction. Moreover, the up (Z1 direction) and the down (Z2 direction) may be each referred to as one side in the second direction and the other side in the second direction. Further, the left (X1 direction) and the right (X2 direction) may be each referred to as one side in the third direction and the other side in the third direction.

Terms indicating directions and positions used in the present specification are used for the sake of convenience in description, and are not intended to limit the technical scope of the present disclosure.

Figure 2:
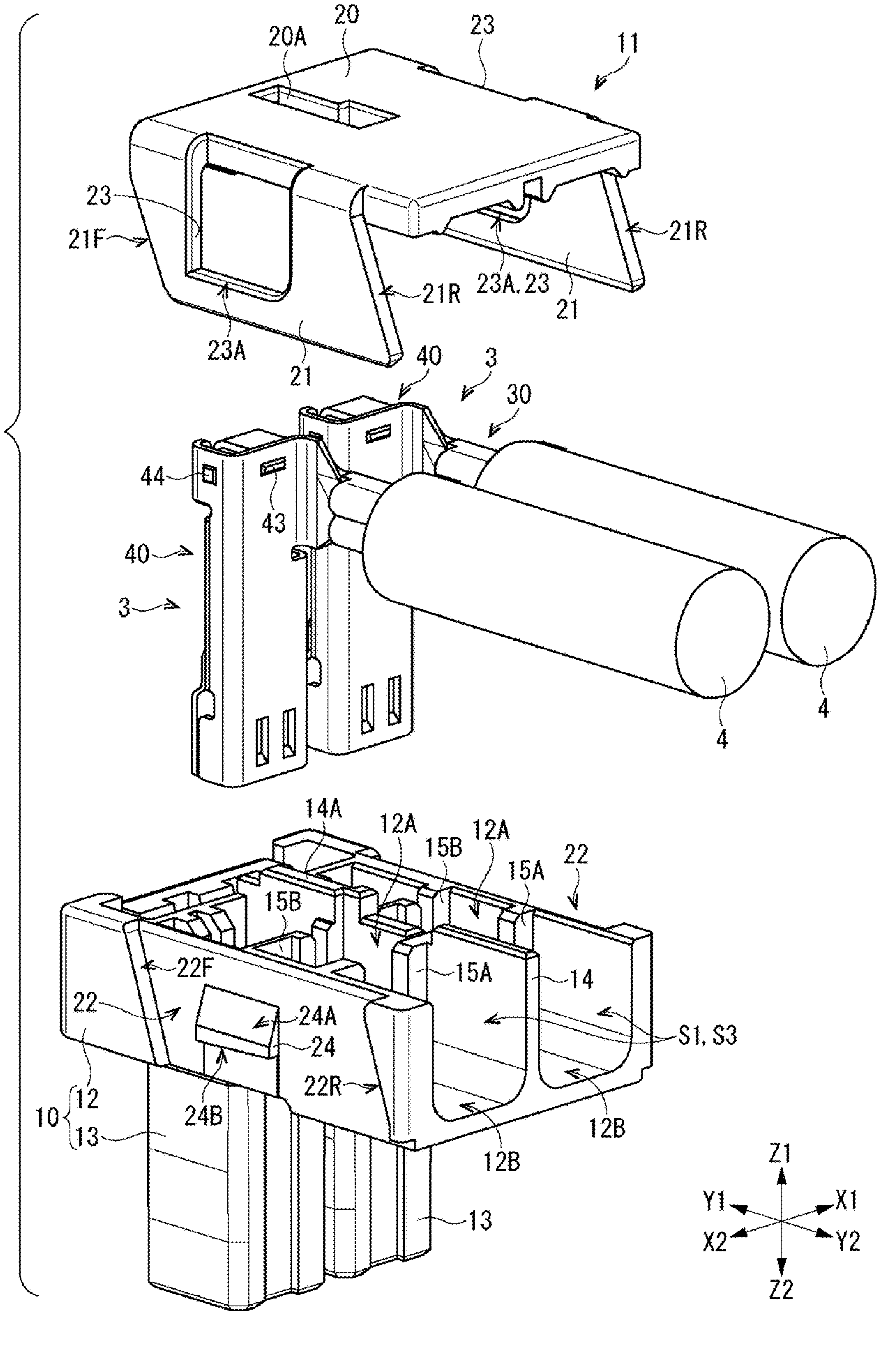
FIG. 2 is an exploded perspective view showing the connector according to the embodiment of the present disclosure.
Figure 3:
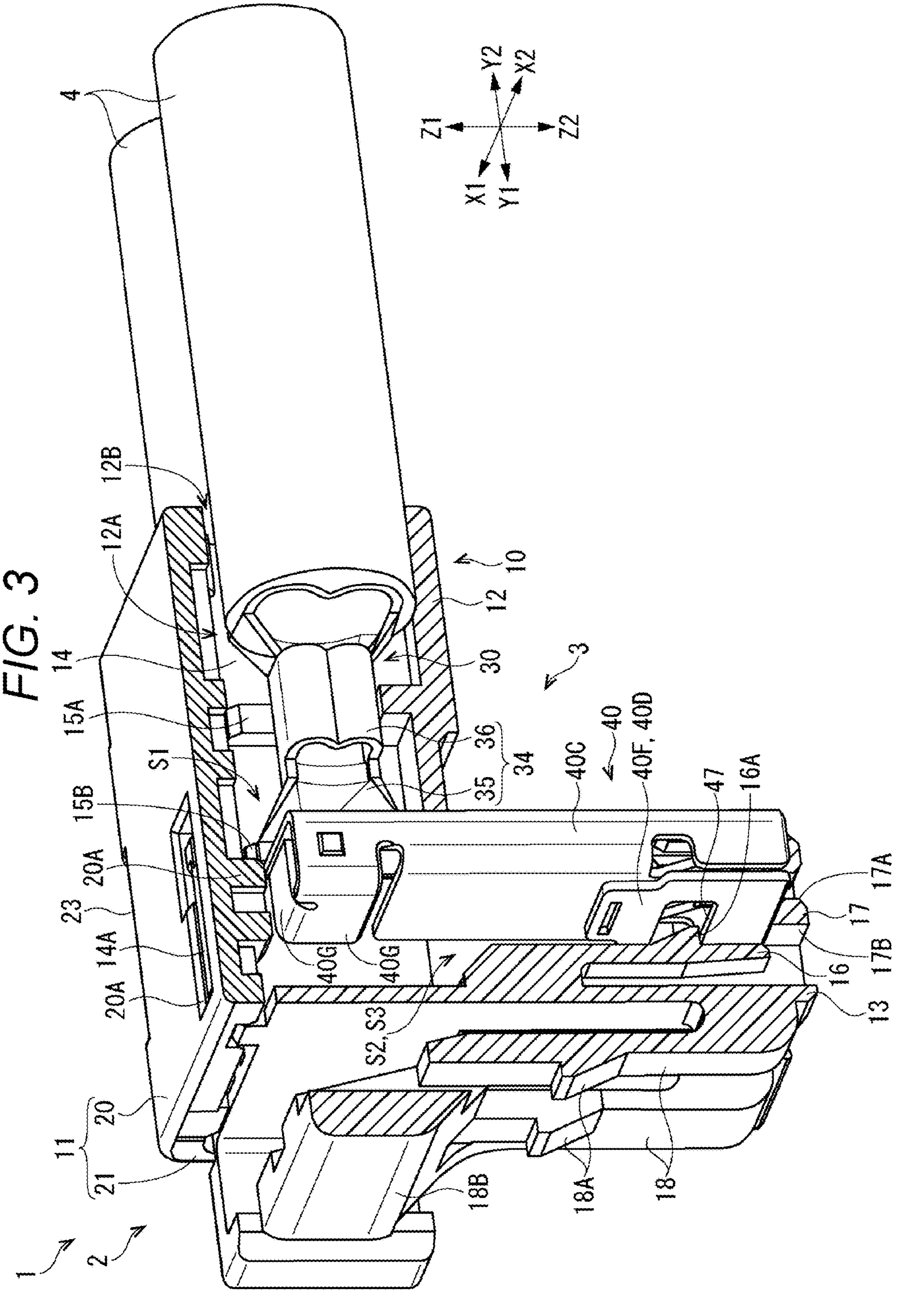
FIG. 3 is a perspective view partially showing the section of the connector according to the embodiment of the present disclosure.
Figure 4A:
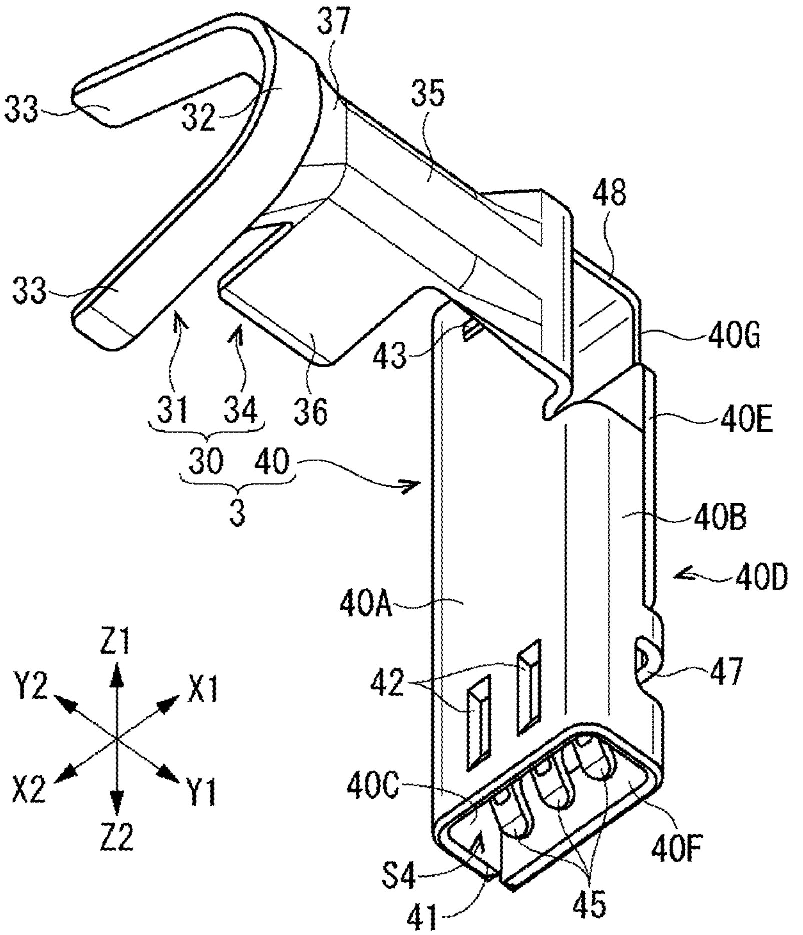
FIG. 4A is a perspective view showing (diagonally from below) a crimp terminal to be attached to the connector according to the embodiment of the present disclosure.
Figure 4B:
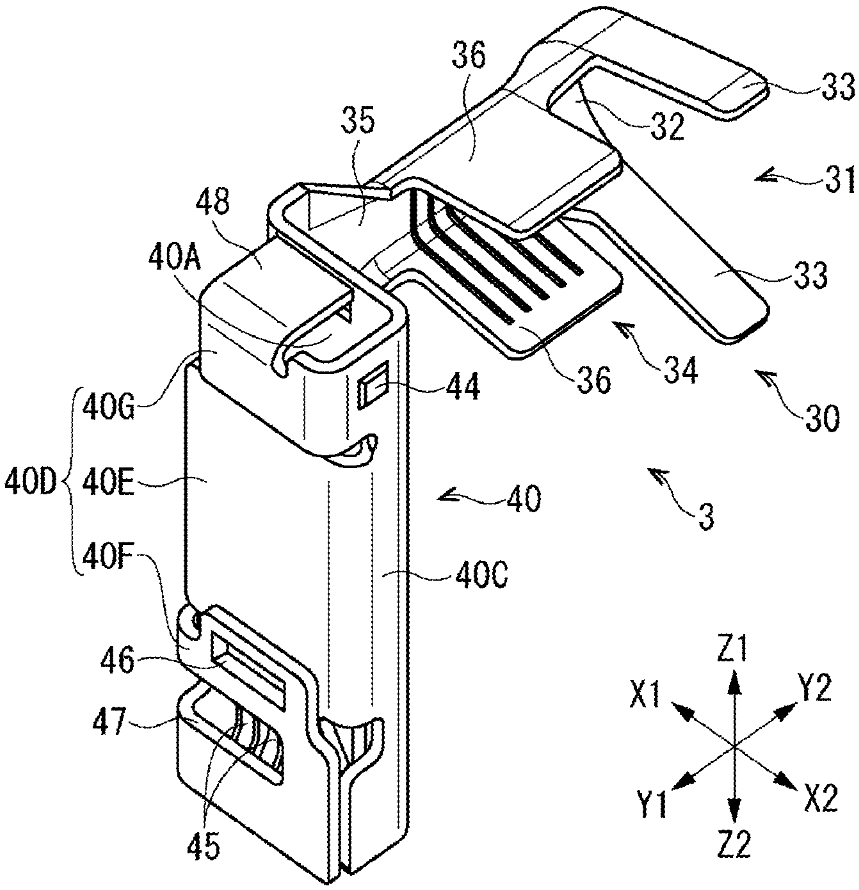
FIG. 4B is a perspective view showing (diagonally from above) the crimp terminal to be attached to the connector according to the embodiment of the present disclosure.
Figure 5:
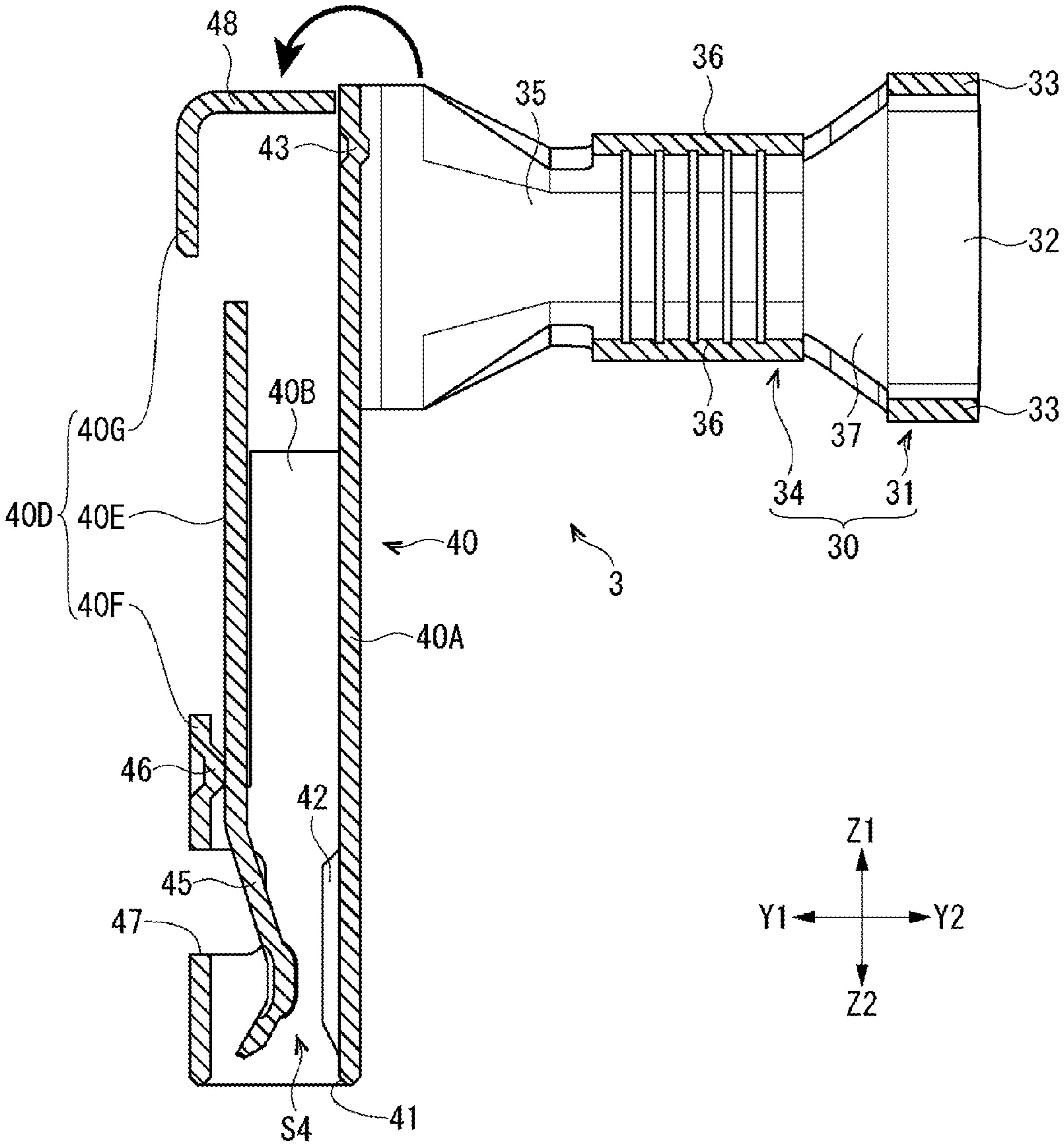
FIG. 5 is a sectional view showing the crimp terminal to be attached to the connector according to the embodiment of the present disclosure.
Figure 6:
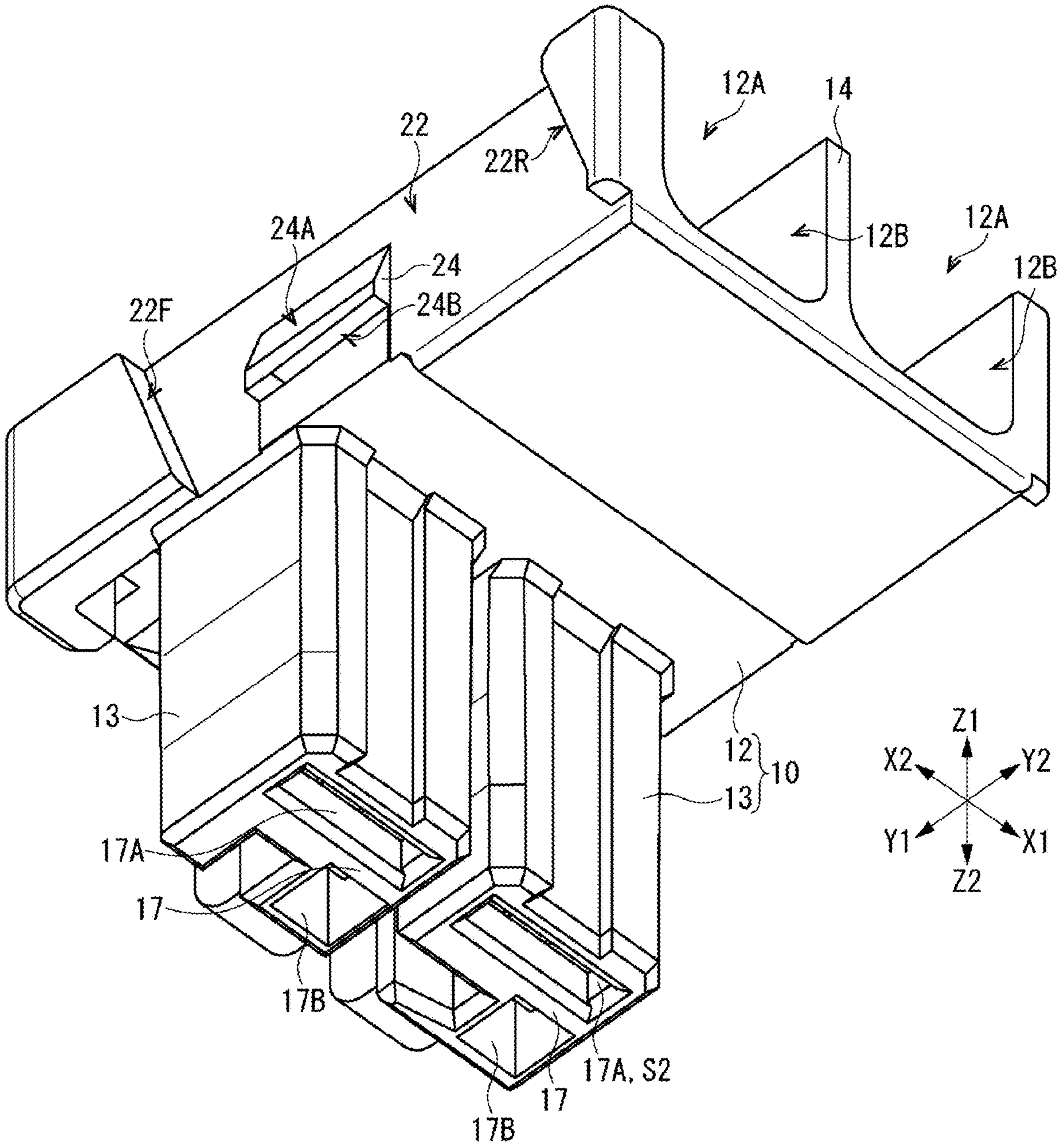
FIG. 6 is a perspective view showing a housing portion of a housing according to the embodiment of the present disclosure.
Figure 7:
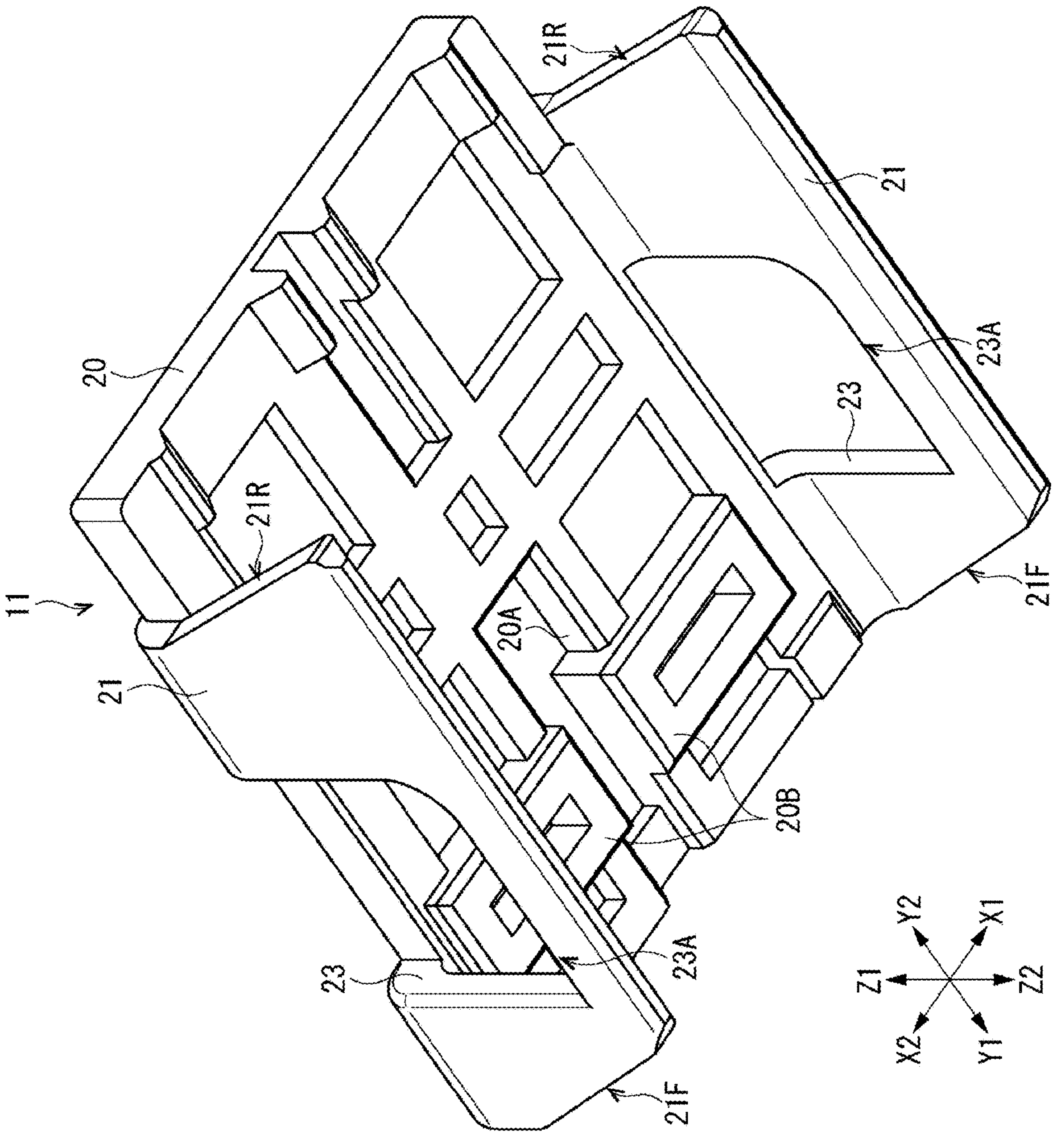
FIG. 7 is a perspective view showing a cover portion of the housing according to the embodiment of the present disclosure.
Figure 8:
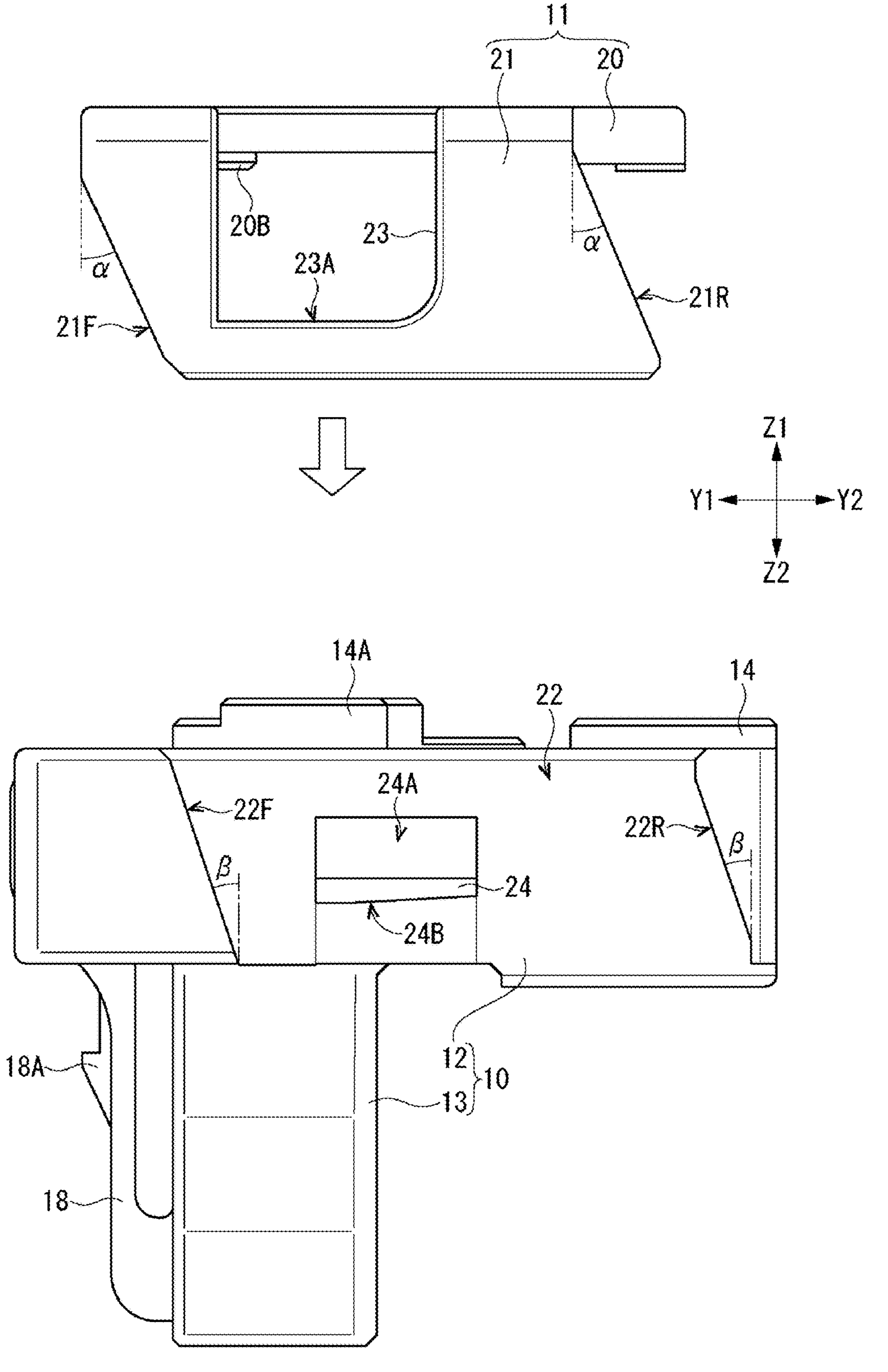
FIG. 8 is an exploded side view showing the housing according to the embodiment of the present disclosure.

A connector 1 according to the present embodiment will be described with reference to FIGS. 1 to 8. FIG. 1 is a perspective view showing the connector 1 and a partner connector 90. FIG. 2 is an exploded perspective view showing the connector 1. FIG. 3 is a perspective view partially showing the section of the connector 1. FIGS. 4A and 4B are perspective views showing a crimp terminal 3. FIG. 5 is a sectional view showing the crimp terminal 3. FIG. 6 is a perspective view showing a housing portion 10 of a housing 2. FIG. 7 is a perspective view showing a cover portion 11 of the housing 2. FIG. 8 is an exploded side view showing the housing 2.

As shown in FIG. 1, the connector 1 is attached to tip end portions of two cables 4, and is formed fittable in the partner connector 90 mounted on an electric board (not shown). Hereinafter, the cable 4 and the partner connector 90 will be briefly described in advance of description of the connector 1. Note that the two cables 4 have the same structure, and therefore, one cable 4 will be mainly described in the present specification.

[Cable]

The cable 4 has a core wire (not shown) made of a conductor (metal) and a covering portion (not shown) made of an insulator and covering the core wire. The core wire is exposed in such a manner that the covering portion of the cable 4 on the tip end side thereof is removed.

[Partner Connector]

The partner connector 90 is configured such that two partner terminals (not shown) are housed in a partner housing 91. For example, the partner housing 91 is made of non-conductive synthetic resin, and is formed in a substantially rectangular tubular shape opened at both end surfaces in the up-down direction. The partner housing 91 stands on the electric board. A pair of lock target portions 92 for holding connection with the connector 1 is provided at a front portion of the partner housing 91. The inside of the partner housing 91 is divided into two spaces in the right-left direction, and two fitting holes 93 are opened corresponding to the two spaces in the upper end surface of the partner housing 91. The two partner terminals are arranged in the two spaces inside the partner housing 91, and are electrically connected to the electric board. Note that the partner connector 90 (partner terminal) is not limited to one mounted on the electric board and may be attached to the tip end portions of the cables 4 (not shown), for example, as in the connector 1 according to the present embodiment.

[Connector]

As shown in FIGS. 1 to 3, the connector 1 includes the housing 2 mainly forming an outer appearance and two crimp terminals 3 housed in the housing 2. Hereinafter, the crimp terminal 3 will be described in advance of description of the housing 2. Note that the two crimp terminals 3 have the same structure, and therefore, one crimp terminal 3 will be mainly described in the present specification. Moreover, in the present embodiment, the partner connector 90 is provided with the two partner terminals, and the connector 1 is provided with the two crimp terminals 3. However, the present disclosure is not limited thereto, and one or more partner terminals and one or more crimp terminals 3 may be provided.

<Crimp Terminal>

As shown in FIGS. 2 and 3, the crimp terminal 3 has a crimp portion 30 and a terminal connection portion 40. As viewed from the side, the crimp terminal 3 is in a substantially L shape formed of the crimp portion 30 extending backward (Y2 direction) and the terminal connection portion 40 extending downward (Z2 direction), and the crimp portion 30 is fixed to the tip end portion of the cable 4. Specifically, the crimp portion 30 of the crimp terminal 3 is crimped to a front end portion (tip end portion, one end portion) of the cable 4 extending in the front-back direction (first direction), and the terminal connection portion 40 is bent downward (one side in the second direction) from the crimp portion 30. Note that the crimp terminal 3 is formed in such a manner that one metal plate is punched and bent. That is, the crimp portion 30 and the terminal connection portion 40 are integrally formed.

In a state of the crimp terminal 3 being housed in the housing portion 10 of the housing 2, the crimp portion 30 of the crimp terminal 3 is configured to extend backward (Y2 direction) of the housing 2, and be crimpable to the tip end portion of the cable 4. The cable 4 extends backward (Y2 direction) from the tip end portion of the cable 4 crimped to the crimp portion 30, and extends out of the housing 2.

<Crimp Portion>

As shown in FIGS. 4A, 4B, and 5, the crimp portion 30 has a covering crimp portion 31 and a core crimp portion 34. In the crimp portion 30, the core crimp portion 34 and the covering crimp portion 31 are provided in this order so as to extend backward (Y2 direction).

The covering crimp portion 31 has a covering base portion 32 formed so as to curve as viewed from the back and a pair of covering barrel pieces 33 protruding rightward from both upper and lower ends of the covering base portion 32. The covering base portion 32 and the pair of covering barrel pieces 33 are formed in a substantially U shape as viewed from the back. The covering portion of the cable 4 extending in the front-back direction is mounted on the covering base portion 32. The pair of covering barrel pieces 33 is crimped to the covering portion by being swaged so as to cover the covering portion mounted on the covering base portion 32 (see FIGS. 2 and 3). Note that in FIGS. 2 and 3, the covering crimp portion 31 is not specifically shown.

The core crimp portion 34 has a core base portion 35 formed in a substantially flat plate shape and a pair of core barrel pieces 36 protruding rightward from both upper and lower ends of the core base portion 35. The core base portion 35 is provided continuously to the front end of the covering base portion 32 through an inclined plate portion 37. The inclined plate portion 37 is inclined rightward from the covering base portion 32 to the core base portion 35, and a step corresponding to the thickness of the covering portion of the cable 4 is formed between the covering base portion 32 and the core base portion 35. The core base portion 35 and the pair of core barrel pieces 36 are formed in a substantially backwards C shape as viewed from the back. The core wire of the cable 4 extending in the front-back direction is mounted on the core base portion 35. The pair of core barrel pieces 36 is crimped to the core wire by being swaged so as to cover the core wire amounted on the core base portion 35 (see FIGS. 2 and 3). Note that the core base portion 35 extends forward from a position at which the pair of core barrel pieces 36 is provided. A front portion of the core base portion 35 is formed in a substantially trapezoidal shape the width of which in the up-down direction increases to the front (see FIG. 5).

<Terminal Connection Portion>

The terminal connection portion 40 is provided so as to extend downward (Z2 direction) of the crimp portion 30. The terminal connection portion 40 is formed in a substantially square tubular shape having a substantially rectangular section with the right-left direction as a long side in such a manner that a first flat plate 40A, a left side plate 40B, a right side plate 40C, and a second flat plate 40D are bent in a roll shape. A connection space S4 is formed inside the terminal connection portion 40. A connection opening 41 for insertion of the partner terminal of the partner connector 90 is opened in the lower end surface of the terminal connection portion 40.

(First Flat Plate)

The first flat plate 40A is provided continuously to the front end of the core base portion 35, and is bent rightward (direction of extension of the covering barrel pieces 33 and the core barrel pieces 36) of the core base portion 35 substantially at a right angle. The first flat plate 40A extends rightward and downward from the front end of the core base portion 35. The first flat plate 40A is provided so as to cover (lid) the front end surface of the crimp portion 30. Two pressure-contact raised portions 42 protrude to the connection space S4 (front) at a lower portion of the first flat plate 40A, and a first raised portion 43 protrudes backward at an upper portion of the first flat plate 40A (see FIGS. 4A and 5).

(Pair of Side Plates)

The left side plate 40B is provided continuously to the left end of the first flat plate 40A, and is bent forward of the first flat plate 40A substantially at a right angle. The right side plate 40C is provided continuously to the right end of the first flat plate 40A, and is bent forward of the first flat plate 40A substantially at a right angle. The pair of right side plate 40C and left side plate 40B extends forward from both right and left ends of the first flat plate 40A. Moreover, a second raised portion 44 protrudes rightward at an upper portion of the right side plate 40C (see FIG. 4B). Note that the core base portion 35 is provided continuously to an upper portion of the left end of the first flat plate 40A, and therefore, the left side plate 40B is provided continuously to the left end of the first flat plate 40A at a position lower than the core base portion 35 (see FIG. 4A).

(Second Flat Plate)

The second flat plate 40D faces the first flat plate 40A through a clearance (connection space S4). The second flat plate 40D has an inner flat plate 40E, an outer flat plate 40F, and a reinforcing flat plate 40G.

The inner flat plate 40E is provided continuously to a middle portion of the upper end of the right side plate 40C in the up-down direction, and is bent leftward of the right side plate 40C substantially at a right angle. The inner flat plate 40E extends leftward from the upper end of the right side plate 40C, and a left end portion of the inner flat plate 40E overlaps with the upper end surface of the left side plate 40B. Three pressure-contact pieces 45 are provided at intervals in the right-left direction at a lower portion of the inner flat plate 40E. Each pressure-contact piece 45 extends while being inclined diagonally backward from the up to the down, and a tip end portion thereof is bent and faces diagonally forward (see FIG. 5). Each pressure-contact piece 45 is provided with elastic force so as to displace in the front-back direction with a base portion (upper portion of the pressure-contact piece 45) as a pivot point. Note that the right side plate 40C is provided with a cutout which is recessed at a position adjacent to the lower end of the inner flat plate 40E (see FIG. 4B).

The outer flat plate 40F is provided continuously to a lower portion of the front end of the left side plate 40B, and is bent rightward of the left side plate 40B substantially at a right angle. The outer flat plate 40F extends rightward from the front end of the left side plate 40B, and a right end portion of the outer flat plate 40F overlaps with the upper end surface of the right side plate 40C (covers the upper end surface of the right side plate 40C). Moreover, the outer flat plate 40F is arranged below the inner flat plate 40E, and an upper portion of the outer flat plate 40F overlaps with the front surface of the lower portion of the inner flat plate 40E. The upper portion of the outer flat plate 40F is provided with a protruding support raised portion 46 which contacts the front surface of the inner flat plate 40E (see FIGS. 4B and 5). The outer flat plate 40F contacts the inner flat plate 40E only at the support raised portion 46. Moreover, a lower portion of the terminal connection portion 40 is provided with a locking hole 47 which is drilled from a front portion of the left side plate 40B to the outer flat plate 40F (see FIGS. 4B and 5).

The reinforcing flat plate 40G is provided continuously to an upper portion of the front end of the right side plate 40C, and is bent leftward of the right side plate 40C substantially at a right angle. The reinforcing flat plate 40G extends leftward from the front end of the right side plate 40C. The reinforcing flat plate 40G is arranged above the inner flat plate 40E, and the lower end of the reinforcing flat plate 40G is separated forward and upward from the upper end of the inner flat plate 40E (see FIG. 5). (Reinforcing Piece)

The terminal connection portion 40 further has a reinforcing piece 48 extending from the reinforcing flat plate 40G to the first flat plate 40A. The reinforcing piece 48 is provided continuously to the upper end of the reinforcing flat plate 40G, and is bent backward of the reinforcing flat plate 40G substantially at a right angle. The reinforcing piece 48 extends backward from the upper end of the reinforcing flat plate 40G, and the tip end (back end) of the reinforcing piece 48 faces the first flat plate 40A through a slight clearance (e.g., about 0.1 to 1.0 mm) (see FIGS. 4B and 5). Note that when the crimp terminal 3 is viewed from the left side, an opening communicating with the connection space S4 is formed in an area surrounded by the first flat plate 40A (core base portion 35), the left side plate 40B, the inner flat plate 40E, the reinforcing flat plate 40G, and the reinforcing piece 48 (see FIG. 4A). The upper end of the first flat plate 40A is positioned slightly above (cover portion 11 side) the upper surface (top surface) of the reinforcing piece 48 (see FIG. 5).

A plurality of crimp terminals 3 described above is coupled to a band-shaped carrier (not shown), and forms a terminal coupling body (not shown). The terminal coupling body is wound around a reel (not shown) such that the back end of the covering base portion 32 is connected to the carrier and the covering barrel pieces 33 and the core barrel pieces 36 face outward, and is attached to a terminal crimp device (not shown). The terminal crimp device reels out the terminal coupling body from the reel, supplies the crimp terminal 3 to a crimp position, and crimps the crimp portion 30 to the cable 4 while separating the crimp terminal 3 from the carrier. Specifically, the pair of covering barrel pieces 33 is crimped to the covering portion of the cable 4 by swaging, and the pair of core barrel pieces 36 is crimped to the core wire of the cable 4 by swaging. In the above-described manner, the crimp terminal 3 is fixed to the tip end portion of the cable 4 (see FIGS. 2 and 3). Note that for example, a worker may manually fix (crimp), using a crimp tool, the crimp terminal 3 to the cable 4 without using the terminal crimp device.

<Housing>

Next, the housing 2 for housing the crimp terminal 3 will be described.

As shown in FIGS. 1 to 3, the housing 2 includes the housing portion 10 and the cover portion 11. The housing portion 10 and the cover portion 11 are molded, for example, from an insulator such as synthetic resin. The cover portion 11 is configured to be detachable from the housing portion 10.

<Housing Portion>

The housing portion 10 has a housing body portion 12 and two fitting raised portions 13. The housing body portion 12 and the fitting raised portions 13 are integrally molded. As viewed from the side, the housing portion 10 is in a substantially L shape formed of the housing body portion 12 extending backward (Y2 direction) and the fitting raised portions 13 extending downward (Z2 direction). (Housing Body Portion)

As shown in FIG. 2, the housing body portion 12 is formed in a box shape opened at the upper and back surfaces. A partition wall 14 extending in the front-back direction stands at the substantially center of the inner bottom surface of the housing body portion 12 in the right-left direction. A partition raised portion 14A protrudes upward on the front side of the partition wall 14. The inside of the housing body portion 12 is divided into two first housing spaces S1 by the partition wall 14. Each first housing space S1 is opened to the outside through a housing opening 12A and an extension opening 12B. Each housing opening 12A is opened in the upper end surface (upper surface, end surface on the other side in the second direction) of the housing body portion 12. Each extension opening 12B is opened continuously to the housing opening 12A in the back end surface (back surface) of the housing body portion 12.

First positioning ribs 15A and second positioning ribs 15B protrude from the inner surface of the housing body portion 12 and the partition wall 14 so as to divide each first housing space S1 in the front-back direction. The first positioning ribs 15A are formed on both right and left sides in the first housing space S1 with a gap at a substantially center portion of the first housing space S1 in the right-left direction. The second positioning rib 15B is arranged in front of the first positioning rib 15A with a clearance therebetween. The second positioning rib 15B is formed mainly on the right side in the first housing space S1 with a clearance on the left side in the first housing space S1. (Fitting Raised Portion)

As shown in FIGS. 1 and 2, each of the two fitting raised portions 13 is formed in a substantially square tubular shape, and protrudes downward from a front portion of the lower surface of the housing body portion 12. As shown in FIG. 3, a second housing space S2 communicating with the first housing space S1 is formed inside each fitting raised portion 13. The first housing space S1 and the second housing space S2 integrally form a housing chamber S3 in a substantially L shape as viewed in a section from the side. The housing portion 10 is formed such that the crimp terminal 3 is housable in the housing chamber S3. Note that the partition wall 14 (partition raised portion 14A) is formed to ensure a required creepage distance between the two crimp terminals 3 housed in the two housing chambers S3.

In each fitting raised portion 13 (second housing space S2), a lance portion 16 bent and extending downward after having extended backward from the front inner surface is provided. The lance portion 16 is formed with elastic force so as to displace in the front-back direction with the bent portion as a pivot point. Moreover, a terminal claw portion 16A protrudes on the tip end side of the back surface of the lance portion 16. The terminal claw portion 16A is hooked on the locking hole 47 of the crimp terminal 3 housed in the housing chamber S3.

As shown in FIG. 6, in the lower end surface of each fitting raised portion 13, a connection hole 17A and a release hole 17B are opened so as to be arranged in the front-back direction with a contact portion 17 therebetween and to communicate with the second housing space S2. The release hole 17B is opened at a position closer to the left side in front of the connection hole 17A. The partner terminal of the partner connector 90 is inserted into the connection hole 17A. The release hole 17B is opened such that an operation of detaching the terminal claw portion 16A from the locking hole 47 is performed when the crimp terminal 3 housed in the housing chamber S3 is detached.

As shown in FIGS. 1 and 3, the two fitting raised portions 13 are provided with a pair of lock arms 18 which is bent and extends upward after having extended forward from lower front portions. The pair of lock arms 18 is formed with elastic force so as to displace in the front-back direction with the bent portions as pivot points. A lock claw portion 18A protrudes from the front surface of each lock arm 18. Moreover, an operation portion 18B is bridged between upper end portions of the pair of lock arms 18.

<Cover Portion>

As shown in FIG. 2, the cover portion 11 is formed in a substantially U shape (backwards C shape) opened downward as viewed from the front (or the back). The cover portion 11 is attached to the housing portion 10 so as to embrace the housing portion 10 and close the housing openings 12A of the housing chambers S3 (see FIG. 1). The cover portion 11 has a substantially flat plate-shaped cover body portion 20 and a pair of engagement pieces 21 extending (suspending) downward from both right and left ends of the cover body portion 20. On the front side of the cover body portion 20, a partition hole 20A is drilled at the substantially center of the cover body portion 20 in the right-left direction, and two pressing portions 20B (see FIG. 7) protrude from the inner surface of the cover body portion 20 on both right and left sides of the partition hole 20A.

<Attachment Structure>

As shown in FIG. 1, the connector 1 includes an attachment structure 5 for holding the cover portion 11 with the cover portion 11 attached to the housing portion 10. The attachment structure 5 includes part of the housing portion 10 and part of the cover portion 11. The attachment structure 5 has a pair of engagement grooves 22, the pair of engagement pieces 21, a pair of latching holes 23, and a pair of latching claws 24. Note that the pair of engagement pieces 21 is not only components of the cover portion 11, but also components of the attachment structure 5. Moreover, the pair of engagement grooves 22, the pair of engagement pieces 21, the pair of latching holes 23, and the pair of latching claws 24 have paired shapes symmetrical in the right-left direction, and therefore, one of the components of each pair will be mainly described in the present specification.

(Engagement Groove)

As shown in FIGS. 2, 6, and 8, the engagement groove 22 is recessed in the housing portion 10 (housing body portion 12) on each side (each side surface) in the right-left direction. As viewed from the side, the engagement groove 22 is formed in a substantially parallelogram shape having both upper and lower sides extending substantially horizontally and both front and back sides inclined backward from the up to the down (see FIG. 8). The engagement groove 22 has inner end surfaces on the front and back sides. Both inner end surfaces of the engagement groove 22 in the front-back direction are a pair of inner inclined surfaces 22F, 22R inclined backward from the up to the down. The pair of inner inclined surfaces 22F, 22R facing each other in the front-back direction is formed substantially parallel with each other. Note that a lower end portion of the inner inclined surface 22R positioned in back is formed substantially vertically. Moreover, upper end portions of the pair of inner inclined surfaces 22F, 22R are cut off (chamfered) so as to expand upward.

Note that in description below, one of two inner end surfaces positioned in front (Y1 direction) may be referred to as a first inner end surface and the other inner end surface positioned in back (Y2 direction) may be referred to as a second inner end surface. The first inner end surface and the second inner end surface face each other in the front-back direction. The first inner end surface is positioned on the front side of the engagement groove 22, and the second inner end surface is positioned on the back side (side on which the cable 4 is crimped to the crimp terminal 3) of the engagement groove 22. An inner inclined surface formed at the first inner end surface is the inner inclined surface 22F, and an inner inclined surface formed at the second inner end surface is the inner inclined surface 22R.

(Engagement Piece)

As shown in FIGS. 2, 7, and 8, the engagement piece 21 is provided on each side of the cover portion 11 (cover body portion 20) in the right-left direction. As viewed from the side, the engagement piece 21 is formed in a substantially parallelogram shape having both upper and lower sides extending substantially horizontally and both front and back sides inclined backward from the up to the down (see FIG. 8). The engagement piece 21 has outer end surfaces on the front and back sides. Both outer end surfaces of the engagement piece 21 in the front-back direction are a pair of outer inclined surfaces 21F, 21R inclined backward from the up to the down. The pair of outer inclined surfaces 21F, 21R facing each other in the front-back direction is formed substantially parallel with each other.

Note that in description below, one of two outer end surfaces positioned in front (Y1 direction) may be referred to as a first outer end surface and the other outer end surface positioned in back (Y2 direction) may be referred to as a second outer end surface. The first outer end surface and the second outer end surface face each other in the front-back direction. The first outer end surface is positioned on the front side of the engagement piece 21, and the second outer surface is positioned on the back side (side on which the cable 4 is crimped to the crimp terminal 3) of the engagement piece 21. An outer inclined surface formed at the first outer end surface is the outer inclined surface 21F, and an outer inclined surface formed at the second outer end surface is the outer inclined surface 21R.

With reference to a reference line (vertical line indicated by a chain line in FIG. 8) extending parallel with the up-down direction, the outer inclined surface 21F, 21R of the engagement piece 21 is inclined more greatly than the inner inclined surface 22F, 22R of the engagement groove 22. That is, a relationship between the inclination angle x of the outer inclined surface 21F, 21R with respect to the reference line in the up-down direction and the inclination angle $\beta$ of the inner inclined surface 22F, 22R with respect to the reference line in the up-down direction is $\alpha>\beta$ (see FIG. 8). As a specific example, the inclination angle $\alpha$ of the outer inclined surface 21F, 21R is about 23 degrees, and the inclination angle $\beta$ of the inner inclined surface 22F, 22R is about 19 degrees. Note that the inclination angles $\alpha$, $\beta$ can be freely changed, but may be set within a range of 5 degrees to 60 degrees, for example.

(Latching Hole)

As shown in FIGS. 2, 7, and 8, the latching hole 23 is formed in the engagement piece 21. When the cover portion 11 is viewed from the side, the latching hole 23 is formed such that a lower portion of the engagement piece 21 remains and a portion of the engagement piece 21 extending downward from the upper end thereof is cut out in a substantially rectangular shape. The latching hole 23 is opened at a position slightly shifted forward with respect to the center of the engagement piece 21 in the front-back direction. The lower end of the engagement piece 21 and a lower edge portion 23A of the latching hole 23 are formed substantially horizontally when the cover portion 11 is viewed from the side (see FIG. 8).

(Latching Claw)

As shown in FIGS. 2, 6, and 8, the latching claw 24 protrudes in an area (each of the right and left sides of the housing portion 10) where the engagement groove 22 is formed. The latching claw 24 is a substantially trapezoidal protrusion as viewed from the front (or the back). Moreover, the latching claw 24 is formed in a substantially quadrangular shape having a narrower front-back width than that of the latching hole 23 as viewed from the side. The latching claw 24 protrudes at a position slightly shifted forward with respect to the center of the area, where the engagement groove 22 is formed, in the front-back direction. At the outer surface of the latching claw 24 in the right-left direction, a guide surface 24A inclined outward in the right-left direction from the upper end to the down is formed. The lower end of the latching claw 24 is a latching surface 24B to be hooked on the lower edge portion 23A of the latching hole 23. A front portion of the latching surface 24B is a substantially horizontal surface, and an area of the latching surface 24B from a middle portion to a back portion in the front-back direction is a surface inclined upward from the front to the back.

[Assembly of Connector]

Figure 9A:
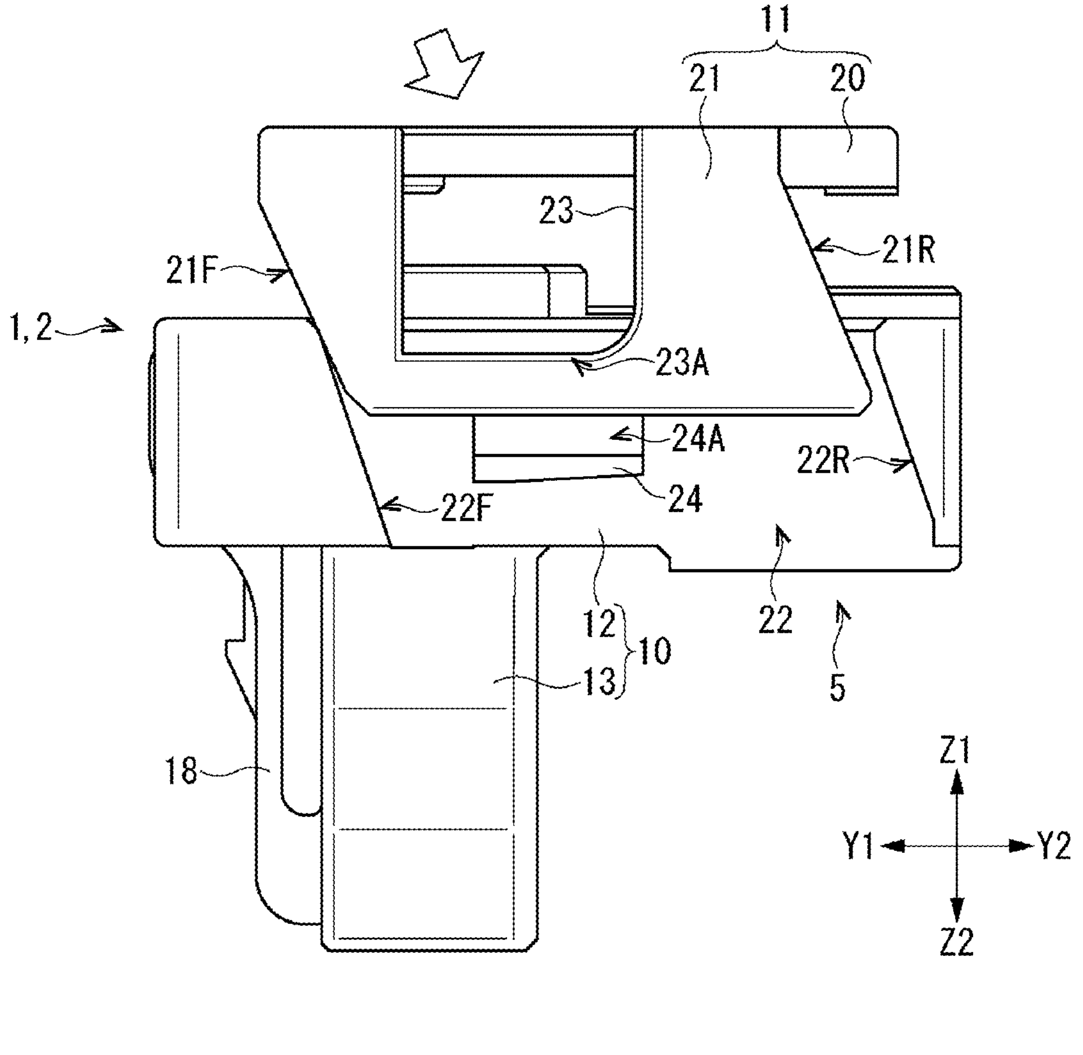
FIG. 9A is a side view showing the connector (housing) according to the embodiment of the present disclosure in a process of attaching the cover portion to the housing portion.
Figure 9B:
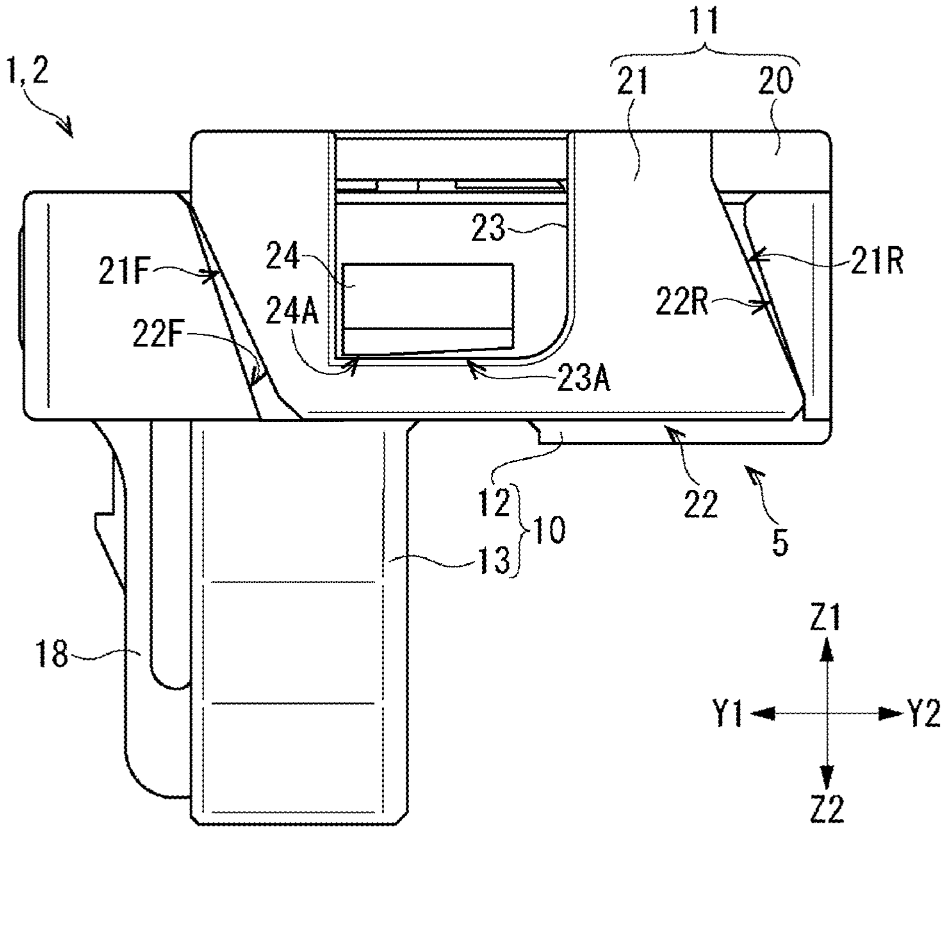
FIG. 9B is a side view showing the connector (housing) according to the embodiment of the present disclosure.

Next, a procedure of assembling the connector 1 will be described with reference to FIGS. 3, 8, 9A, and 9B. FIG. 9A is a side view showing a process of attaching the cover portion 11 to the housing portion 10. FIG. 9B is a side view of the connector 1 (housing 2). Note that in FIGS. 9A and 9B, the cable 4 is not shown.

The worker inserts the terminal connection portion 40 of the crimp terminal 3 into the second housing space S2 of the fitting raised portion 13 of the housing 2 (see FIG. 3). The outer flat plate 40F of the terminal connection portion 40 contacts the terminal claw portion 16A of the lance portion 16, and is inserted while elastically deforming the lance portion 16 forward. As the terminal connection portion 40 is inserted, the terminal claw portion 16A relatively moves upward while being pressed against the front surface of the outer flat plate 40F with the restoring force (elastic force) of the lance portion 16, and is fitted in the locking hole 47 of the outer flat plate 40F (see FIG. 3). In this state, the tip end (lower end) of the terminal connection portion 40 contacts an edge portion (contact portion 17) of the connection hole 17A, and the connection opening 41 of the terminal connection portion 40 faces (communicates with) the connection hole 17A.

In a state of the terminal claw portion 16A being locked to the locking hole 47, the crimp portion 30 of the crimp terminal 3 is fitted in the first housing space S1 of the housing body portion 12 of the housing 2 (see FIG. 3). Specifically, the core barrel piece 36 is supported on the first positioning rib 15A, and the core base portion 35 positioned in front of the core barrel piece 36 is inserted into the clearance on the left side in the first housing space S1, which is formed by the second positioning rib 15B.

In the above-described manner, the crimp terminal 3 is housed in the housing chamber S3 through the housing opening 12A of the housing portion 10. Note that the reinforcing flat plate 40G, first raised portion 43, and second raised portion 44 of the crimp terminal 3 are in the vicinity of (or contact) the inner surface of the fitting raised portion 13 (second housing space S2) of the housing portion 10 through a slight clearance. With this configuration, the terminal connection portion 40 is positioned in the second housing space S2. The cable 4 extends backward from the extension opening 12B of the housing portion 10 (exposed to the outside of the housing portion 10).

The worker attaches the cover portion 11 to the housing portion 10 such that the housing opening 12A is closed and the crimp terminal 3 housed in the housing chamber S3 is covered. Specifically, the worker arranges the cover portion 11 above the housing portion 10 (see FIG. 8), aligns lower end portions of the pair of engagement pieces 21 with upper end portions of the pair of engagement grooves 22, and pushes the cover portion 11 downward. At this time, the engagement piece 21 enters the engagement groove 22 while the outer inclined surface 21F positioned in front (one side in the first direction) is contacting an upper portion (upper side, other side in the second direction) of the inner inclined surface 22F positioned in front (see FIG. 9A). The worker presses the cover portion 11 to substantially immediately below, and only by such pressing, the cover portion 11 naturally moves substantially in parallel diagonally to the lower back side with maintained in a substantially horizontal posture while being guided by the upper portion of the inner inclined surface 22F contacting the outer inclined surface 21F (see a white arrow shown in FIG. 9A).

As the cover portion 11 slides diagonally to the lower back side, the lower end portion of the engagement piece 21 contacts the guide surface 24A of the latching claw 24 (see FIG. 9A). As the cover portion 11 slides, the engagement piece 21 bends so as to expand outward in the right-left direction with a portion connected to the cover body portion 20 as the point of support, and the lower end portion of the engagement piece 21 moves downward while contacting the guide surface 24A. As the cover portion 11 further slides, the lower edge portion 23A of the latching hole 23 moves over the latching claw 24, the engagement piece 21 returns to an original state by restoring force about the portion connection to the cover body portion 20, and the latching claw 24 is fitted in the latching hole 23 (see FIG. 9B).

In the above-described manner, the cover portion 11 is attached to the housing portion 10 so as to close the housing opening 12A (see FIG. 9B). That is, the connector 1 is completed (also see FIGS. 1 and 3). Note that in a state of the housing opening 12A being closed with the cover portion 11, i.e., a state of the connector 1 being completed, the partition raised portion 14A protruding from the partition wall 14 of the housing portion 10 is fitted in the partition hole 20A of the cover portion 11 (see FIG. 1). Moreover, the pressing portion 20B (upper end of the first flat plate 40A) of the cover portion 11 is in the vicinity of (or contacts) the reinforcing piece 48 of the crimp terminal 3 housed in the housing chamber S3 through a slight clearance (see FIG. 3). With this configuration, the crimp terminal 3 is positioned inside the housing 2 (housing chamber S3).

As shown in FIG. 9B, in a state of the housing opening 12A being closed with the cover portion 11 (state of the connector 1 being completed), the engagement piece 21 is fitted in the engagement groove 22, and the latching claw 24 (latching surface 24B) is hooked on the lower edge portion 23A of the latching hole 23. Specifically, the outer inclined surface 21F of the engagement piece 21 and the inner inclined surface 22F of the engagement groove 22 positioned in front contact each other only at upper portions in the vicinity of the upper ends, and are apart from each other at other portions (a clearance is formed therebetween). The outer inclined surface 21R of the engagement piece 21 and the inner inclined surface 22R of the engagement groove 22 positioned in back contact each other only at lower portions in the vicinity of the lower ends, and are apart from each other at other portions (a clearance is formed therebetween). The latching hole 23 and the latching claw 24 are arranged slightly in front of, e.g., the area where the engagement groove 22 is formed, and therefore, are hooked on each other at the position slightly shifted forward with respect to the center of the area, where the engagement groove 22 is formed, in the front-back direction. The substantially-horizontal front portion of the latching surface 24B of the latching claw 24 contacts (is hooked on) the lower edge portion 23A of the latching hole 23, but the inclined portion (portion from the middle portion to the back portion) other than the front portion is apart upward from the lower edge portion 23A (a clearance is formed therebetween). Note that in the present specification, a phrase of the "engagement piece 21 being fitted in the engagement groove 22" is not limited to a state of the engagement piece 21 and the engagement groove 22 having the substantially same shape and being fitted in each other with no great clearance, and includes a state of the engagement piece 21 and the engagement groove 22 having the substantially same shape and being loosely fitted in each other with a slight clearance.

Even when the cover portion 11 attached to the housing portion 10 is lifted vertically upward or diagonally to the upper front side, the outer inclined surface 21R of the engagement piece 21 contacts the inner inclined surface 22R of the engagement groove 22, and the latching surface 24B of the latching claw 24 contacts the lower edge portion 23A of the latching hole 23. This restricts detachment of the cover portion 11 from the housing portion 10 (also see FIG. 10). In a case where the cover portion 11 is detached from the housing portion 10, the worker may open the pair of engagement pieces 21 outward in the right-left direction, release the latching claws 24 from the latching holes 23, and slide the cover portion 11 diagonally to the upper front side. At this time, while the outer inclined surface 21F of the engagement piece 21 is contacting the upper side of the inner inclined surface 22F of the engagement groove 22, the cover portion 11 may be slid. Note that in a case where the crimp terminal 3 is detached from the housing 2, the worker may detach the cover portion 11 from the housing portion 10, insert a thin needle-shaped tool into the release hole 17B of the fitting raised portion 13, and elastically deform the lance portion 16 upward. In this manner, the terminal claw portion 16A may be detached from the locking hole 47, and the crimp terminal 3 may be pulled out of the housing chamber S3.

[Connection between Connector and Partner Connector]

Figure 10:
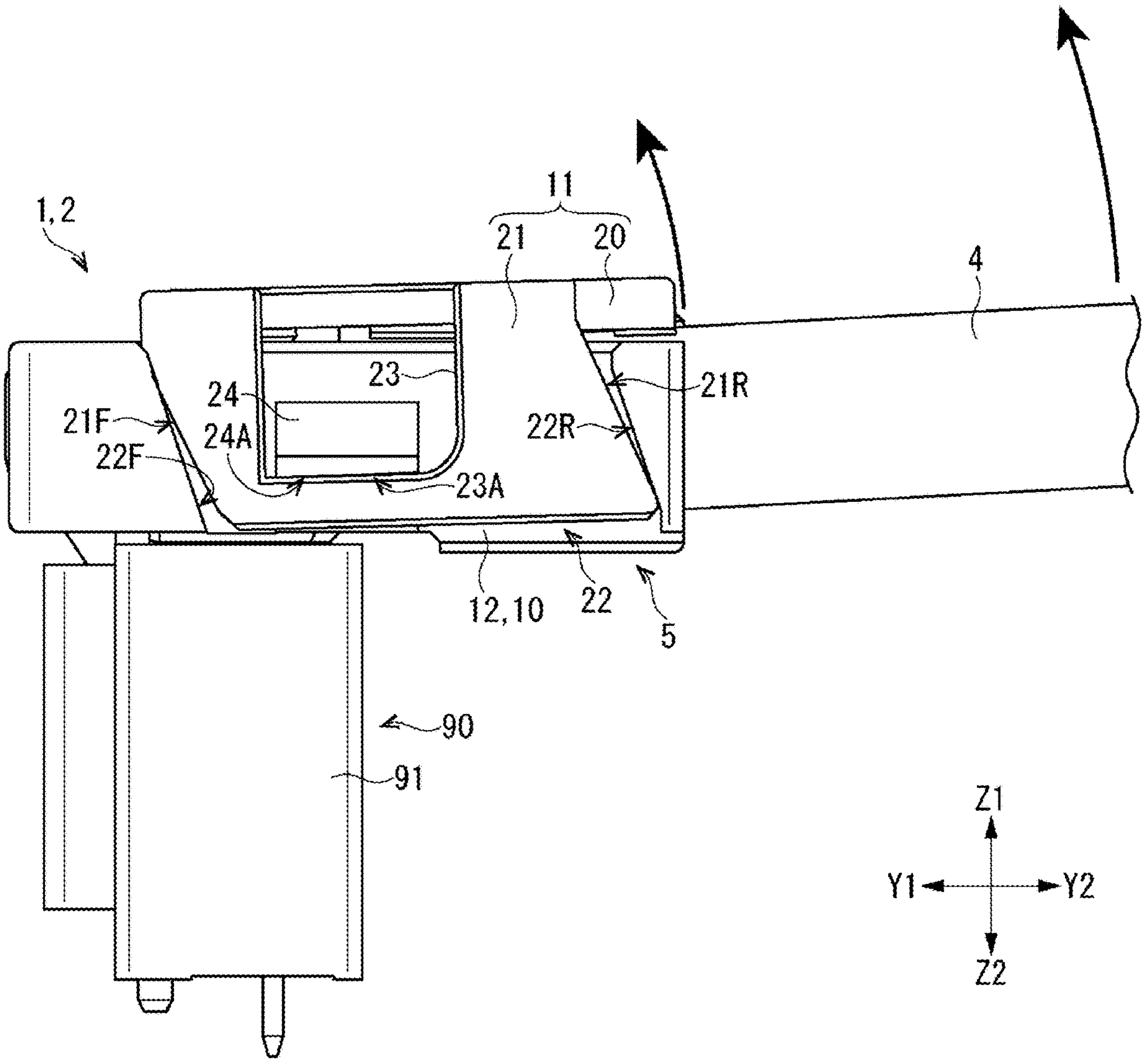
FIG. 10 is a side view showing a state of the connector according to the embodiment of the present disclosure being connected to the partner connector.

Next, connection between the connector 1 and the partner connector 90 will be briefly described with reference to FIG. 10. FIG. 10 is a side view showing a state of the connector 1 being connected to the partner connector 90.

In a case where the connector 1 is connected to the partner connector 90, the worker inserts the two fitting raised portions 13 of the connector 1 into the two fitting holes 93 of the partner connector 90, and inserts the pair of lock arms 18 of the connector 1 into the pair of lock target portions 92 of the partner connector 90 (not shown). Each partner terminal relatively enters the connection space S4 through the connection opening 41, is inserted while elastically deforming the three pressure-contact pieces 45 forward, and is sandwiched between the three pressure-contact pieces 45 and the two pressure-contact raised portions 42 (not shown). The lock claw portion 18A of each lock arm 18 is locked to a recessed portion inside the lock target portion 92 (not shown). In the above-described manner, the connector 1 is connected to the partner connector 90 (see FIG. 10). Note that in a case where the connector 1 is separated from the partner connector 90, the worker may pull the partner connector 90 while unlocking the lock claw portion 18A by pushing the operation portion 18B.

As shown in FIG. 9B, the connector 1 is in a substantially L shape. The connector 1 (right angle connector) bent in the substantially L shape as described above can be easily connected to the partner connector 90 mounted on the electric board without forcibly bending the cable 4. Moreover, the total height of the connector 1 bent in the substantially L shape can also be suppressed low.

For example, in some cases, a process of aligning the cable 4 is performed in a state of the connector 1 being connected to the partner connector 90. In this process, the cable 4 may be pulled upward (direction crossing the direction of extension of the cable 4) because the cable 4 is carelessly caught by, e.g., a hand (see thick arrows shown in FIG. 10). In this case, the crimp portion 30 crimped to the cable 4 slightly turns with the portion connected to the terminal connection portion 40 as a pivot point (see a thick arrow shown in FIG. 5), and accordingly, the cover portion 11 also turns with a front end portion (vicinity of a contact point between the outer inclined surface 21F and the inner inclined surface 22F in front) as a pivot point (see the thick arrows shown in FIG. 10). Thus, the back side of the cover portion 11 may be lifted from the housing portion 10 (see FIG. 10). Depending on the magnitude of force of pulling the cable 4, there is a probability that the engagement pieces 21 on both right and left sides of the cover portion 11 are opened outward, the latching claws 24 are detached from the latching holes 23, and the cover portion 11 is separated from the housing portion 10.

In response to the above-described problem, the housing 2 (connector 1) according to the present embodiment is configured such that the inner inclined surface 22R of the engagement groove 22 and the outer inclined surface 21R of the engagement piece 21 facing each other on the back side of the housing 2 are inclined backward (direction of extension of the cable 4 connected to the crimp terminal 3) from the up to the down (see, e.g., FIG. 8). Moreover, it is configured such that when the cover portion 11 closes the housing opening 12A, the lower portions of the above-described outer inclined surface 21R and inner inclined surface 22R contact each other (see FIG. 9B).

If the cable 4 is pulled in a direction (upward) of separating from the connector 1, the cover portion 11 slightly turns with the front end portion (vicinity of the contact point between the outer inclined surface 21F and the inner inclined surface 22F in front) as a pivot point. However, according to the above-described configuration of the housing 2, the outer inclined surface 21R of the engagement piece 21 is pressed against the inner inclined surface 22R of the engagement groove 22 (see FIG. 10), and therefore, excessive turn of the cover portion 11 is restricted. Thus, great lifting of the back of the cover portion 11 from the housing portion 10 can be reduced. As a result, separation of the cover portion 11 from the housing portion 10 due to detachment of the engagement piece 21 from the engagement groove 22 can be reduced.

In the crimp terminal 3 housed in the housing 2, the reinforcing piece 48 extends from the front end of the reinforcing flat plate 40G to the first flat plate 40A, and the tip end thereof faces the first flat plate 40A through the slight clearance (see FIG. 5). According to this configuration, even when the cable 4 is pulled and the crimp portion 30 turns so as to open from the terminal connection portion 40, the tip end of the reinforcing piece 48 bumps the first flat plate 40A, and turn of the crimp portion 30 can be restricted by the reinforcing piece 48 bridged between the first flat plate 40A and the reinforcing flat plate 40G. With this configuration, resistance against turning force acting on the crimp portion 30 can be obtained, and excessive deformation of the crimp terminal 3 can be reduced. As a result, great lifting of the back of the cover portion 11 from the housing portion 10 can be reduced, and separation of the cover portion 11 from the housing portion 10 can be reduced. As described above, the attachment structure 5 of the housing 2 and the crimp terminal 3 (reinforcing piece 48) cooperate with each other so that separation of the cover portion 11 from the housing portion 10 can be effectively reduced.

According to the housing 2 of the present embodiment, in a case where the housing opening 12A is closed with the cover portion 11, the latching claw 24 can be hooked on the lower edge portion 23A of the latching hole 23 in addition to contact between the outer inclined surface 21R and the inner inclined surface 22R facing each other in back (see FIG. 9B). With this configuration, a state of the housing portion 10 and the cover portion 11 being connected to each other can be reinforced, and separation of the cover portion 11 from the housing portion 10 can be effectively reduced.

In the housing 2 according to the present embodiment, the latching hole 23 and the latching claw 24 are hooked on each other at the position shifted forward with respect to the center of the area, where the engagement groove 22 is formed, in the front-back direction (see FIG. 9B). According to this configuration, hooking of the latching hole 23 and the latching claw 24 can mainly effectively reduce lifting of the front of the cover portion 11 from the housing portion 10.

If the entirety of the latching surface 24B of the latching claw 24 contacts the entirety of the lower edge portion 23A of the latching hole 23 (not shown), when the cable 4 is pulled in a direction (upward) of separating from the connector 1, the cover portion 11 slightly turns with the front end portion as a pivot point, and the latching surface 24B is brought into a one-side contacting state in which the latching surface 24B contacts only a back portion of the lower edge portion 23A of the latching hole 23 and is apart from the lower edge portion 23A of the latching hole 23 in front thereof. When the cable 4 is further pulled in this state, there is a probability that the lower edge portion 23A of the latching hole 23 is detached from the latching surface 24B and moves over the latching claw 24. On the other hand, in the housing 2 according to the present embodiment, the latching surface 24B is inclined, and when the housing opening 12A is closed with the cover portion 11, the latching surface 24B contacts only the front of the lower edge portion 23A of the latching hole 23 (see FIG. 9B). According to this configuration, when the cable 4 is pulled and the cover portion 11 slightly turns with the front end portion as a pivot point, an entirely-contacting state is brought, in which the entirety of the latching surface 24B contacts the entirety of the lower edge portion 23A of the latching hole 23 (see FIG. 10). In other words, the lower surface of the latching surface 24B and the upper surface of the lower edge portion 23A are in surface contact with each other. With this configuration, even when the cable 4 is further pulled, a state of the latching surface 24B of the latching claw 24 being firmly hooked on the lower edge portion 23A of the latching hole 23 can be held.

According to the housing 2 of the present embodiment, the inclination angle of the outer inclined surface 21F, 21R of the engagement piece 21 as viewed from the side is smaller than the inclination angle of the inner inclined surface 22F, 22R of the engagement groove 22 as viewed from the side. Thus, in a state of the engagement piece 21 being fitted in (inserted into) the engagement groove 22, a lower end corner portion (outer inclined surface 21R) of the back of the engagement piece 21 can be bitten into the lower side of the inner inclined surface 22R positioned in back (see FIG. 9B). With this configuration, the inner inclined surface 22R and the outer inclined surface 21R positioned in back can be held in a contact state, and detachment of the engagement piece 21 from the engagement groove 22 can be reduced.

In the housing 2 according to the present embodiment, the engagement piece 21 is fitted in the engagement groove 22 while the outer inclined surface 21F positioned in front is contacting the upper portion of the inner inclined surface 22F positioned in front (see FIG. 9A). According to this configuration, the engagement piece 21 can be smoothly fitted in the engagement groove 22 with the upper portion of the inner inclined surface 22F as a guide.

According to the connector 1 of the present embodiment, the housing 2 and the crimp terminal 3 are formed in the substantially L shape, and therefore, the connector 1 can be easily connected to the partner connector 90 mounted on the electric board without forcibly bending the cable 4, for example. Thus, it is not necessary to expand a space where the connector 1 and the partner connector 90 are arranged more than necessary, and a device including the connector 1 and the partner connector 90 can be reduced in size.

Note that in the housing 2 according to the present embodiment, the engagement grooves 22 are recessed in the housing portion 10 on both right and left sides thereof and the engagement pieces 21 are provided on both right and left sides of the cover portion 11. However, the present disclosure is not limited thereto. For example, the engagement grooves 22 may be recessed in the cover portion 11 on both right and left sides thereof, and the engagement pieces 21 may be provided on both right and left sides of the housing portion 10 (not shown).

In the housing 2 according to the present embodiment, the pair of inner inclined surfaces 22F, 22R is provided on both sides of the engagement groove 22 in the front-back direction, but the present disclosure is not limited thereto. At least the back inner end surface of both inner end surfaces of the engagement groove 22 in the front-back direction may be the inner inclined surface 22R. That is, the pair of inner inclined surfaces 22F, 22R is not necessarily parallel with each other. For example, in a case where only the back inner inclined surface 22R is provided, the front inner end surface of the engagement groove 22 may be, for example, a vertical surface (not shown). Moreover, the engagement groove 22 does not necessarily include the pair of inner inclined surfaces 22F, 22R (inner end surfaces) facing each other in the front-back direction, and for example, only a protrusion configured to contact the outer inclined surface 21F to guide entrance of the engagement piece 21 into the engagement groove 22 may protrude from an upper front portion of the engagement groove 22 (not shown). That is, such a protrusion may be employed as a substitution for the inner inclined surface 22F, and the engagement groove 22 may be formed between the protrusion and the inner inclined surface 22R.

In the housing 2 according to the present embodiment, the pair of outer inclined surfaces 21F, 21R is provided on both sides of the engagement piece 21 in the front-back direction, but the present disclosure is not limited thereto. At least the back outer end surface of both outer end surfaces of the engagement piece 21 in the front-back direction may be the outer inclined surface 21R. That is, the pair of outer inclined surfaces 21F, 21R is not necessarily parallel with each other. For example, in a case where only the back outer inclined surface 21R is provided, the front outer end surface of the engagement piece 21 may be, for example, a vertical surface (not shown). Moreover, in the present embodiment, the outer inclined surface 21F, 21R of the engagement piece 21 is more greatly inclined than the inner inclined surface 22F, 22R of the engagement groove 22, but the present disclosure is not limited thereto. For example, the inclination angle of the outer inclined surface 21F, 21R may be the same as the inclination angle of the inner inclined surface 22F, 22R (not shown).

In the housing 2 according to the present embodiment, when the housing opening 12A is closed with the cover portion 11, the inner inclined surface 22R and the outer inclined surface 21R in back contact each other only at the lower portions thereof, but the present disclosure is not limited thereto. The inner inclined surface 22R and the outer inclined surface 21R may contact each other, for example, at a portion extending from the vicinity of the center in the up-down direction to the lower end or over the entire area in the up-down direction (neither case is shown). Similarly, the inner inclined surface 22F and the outer inclined surface 21F positioned in front may contact each other, for example, at a portion extending from the vicinity of the center in the up-down direction to the upper end or over the entire area in the up-down direction (neither case is shown).

In the housing 2 according to the present embodiment, the latching surface 24B has the horizontal surface and the inclined surface, but the present disclosure is not limited thereto. For example, the entirety of the latching surface 24B may be a surface inclined upward from the front end to the back end (not shown). Alternatively, the entirety of the latching surface 24B may be a substantially horizontal surface (not shown). Moreover, in the housing 2 according to the present embodiment, the lower edge portion 23A of the latching hole 23 is substantially horizontal and the latching surface 24B of the latching claw 24 is inclined, but the present disclosure is not limited thereto. For example, the lower edge portion 23A of the latching hole 23 may have a portion inclined downward from the front to the back, and the latching surface 24B of the latching claw 24 may be formed substantially horizontally (not shown). That is, either one of the lower edge portion 23A of the latching hole 23 or the latching surface 24B of the latching claw 24 may be inclined with respect to the other one of the lower edge portion 23A or the latching surface 24B such that the front portions thereof (portions on one side in the first direction) contact each other and the back portions thereof (portions on the other side in the first direction) are apart from each other.

In the housing 2 according to the present embodiment, the latching hole 23 is formed in the engagement piece 21 and the latching claw 24 protrudes from the area (side surface of the housing portion 10) where the engagement groove 22 is formed, but the present disclosure is not limited thereto. For example, the latching hole 23 may be recessed in the area (side surface of the housing portion 10) where the engagement groove 22 is formed, and the latching claw 24 may protrude from the engagement piece 21 (the inner surface thereof) (not shown). Note that the latching hole 23 is not necessarily the penetrating opening and may be a bottomed recess (dent).

In the housing 2 according to the present embodiment, the attachment structure 5 has the engagement grooves 22, the engagement pieces 21, the latching holes 23, and the latching claws 24, but the present disclosure is not limited thereto. For example, the latching holes 23 and the latching claws 24 may be omitted, and the attachment structure 5 may include the engagement grooves 22 and the engagement pieces 21 (not shown). In this case, a hook to be hooked on a lower corner portion of the housing body portion 12 may be provided at the tip end (lower end) of the engagement piece 21 (not shown). Moreover, e.g., a hook to be hooked on the housing portion 10 may be provided at a front end portion of the cover body portion 20 (not shown).

Note that in the crimp terminal 3 according to the present embodiment, the inner flat plate 40E is provided continuously to the front end of the right side plate 40C and the outer flat plate 40F is provided continuously to the front end of the left side plate 40B, but the present disclosure is not limited thereto. For example, the inner flat plate 40E may be provided continuously to the front end of the left side plate 40B, and the outer flat plate 40F may be provided continuously to the front end of the right side plate 40C (not shown). Alternatively, for example, the inner flat plate 40E and the outer flat plate 40F may be provided continuously only to either one of the left side plate 40B or the right side plate 40C (not shown). The second flat plate 40D includes the reinforcing flat plate 40G, but the present disclosure is not limited thereto and the reinforcing flat plate 40G may be omitted (not shown). In this case, the reinforcing piece 48 may be provided continuously to the inner flat plate 40E (not shown).

In the crimp terminal 3 according to the present embodiment, the reinforcing piece 48 extends from the upper end of the reinforcing flat plate 40G to the first flat plate 40A, but the present disclosure is not limited thereto. For example, the reinforcing piece 48 may extend from the first flat plate 40A to the reinforcing flat plate 40G (not shown). The reinforcing piece 48 may include a plurality of reinforcing pieces 48, and for example, a reinforcing piece 48 extending from the reinforcing flat plate 40G to the first flat plate 40A and a reinforcing piece 48 extending from the first flat plate 40A to the reinforcing flat plate 40G may be provided (not shown). For example, the reinforcing piece 48 may extend from the upper end of the right side plate 40C to the left side plate 40B side (not shown). The tip end of the reinforcing piece 48 is apart from the first flat plate 40A, but the present disclosure is not limited thereto and the reinforcing piece 48 may contact the first flat plate 40A (not shown). As long as a joint portion between the crimp portion 30 and the terminal connection portion 40 has sufficient stiffness, the reinforcing piece 48 may be omitted (not shown). In this case, each pressing portion 20B of the cover portion 11 may be pressed against the upper end surface of the terminal connection portion 40 of the crimp terminal 3 (not shown).

In the crimp terminal 3 according to the present embodiment, the step (inclined plate portion 37) is provided between the covering base portion 32 of the crimp portion 30 and the core base portion 35 (see FIG. 4A), but the present disclosure is not limited thereto and the covering base portion 32 and the core base portion 35 may be provided in the same plane (not shown). The pair of covering barrel pieces 33 and the pair of core barrel pieces 36 are provided, but the present disclosure is not limited thereto and, for example, one covering barrel piece 33 and one core barrel piece 36 may be provided (not shown). The crimp portion 30 includes the covering crimp portion 31 and the core crimp portion 34, but the present disclosure is not limited thereto. The covering crimp portion 31 may be omitted, and only the core crimp portion 34 may be provided (not shown). In this case, the base end of the core base portion 35 is provided continuously to the carrier (not shown).

In the crimp terminal 3 according to the present embodiment, the terminal connection portion 40 is formed in the substantially square tubular shape, but the present disclosure is not limited thereto and the terminal connection portion 40 may be in a shape electrically connectable to the partner terminal. For example, as long as the partner terminal is formed so as to sandwich the terminal connection portion 40, the terminal connection portion 40 may be in the shape of one plate or one rod (not shown).

In the crimp terminal 3 according to the present embodiment, the terminal connection portion 40 is bent substantially at the right angle from the crimp portion 30, but is not limited to the right angle and may be slightly at an obtuse angle or an acute angle (not shown).

Note that description of the embodiment above describes one aspect of the housing and the connector according to the present disclosure and the technical scope of the present disclosure is not limited to the above-described embodiment. The components in the embodiment above can be replaced or combined with, e.g. existing components as necessary, and description of the embodiment above is not intended to limit the contents of the disclosure described in the claims.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A housing comprising:

a housing portion;

a cover portion; and an attachment structure, wherein the housing portion has a housing chamber and a housing opening opened in an upper surface of the housing chamber, the cover portion is configured to be attachable to the housing portion so as to close the housing opening, the attachment structure has an engagement groove and an engagement piece, the engagement groove is recessed in either one of the housing portion or the cover portion on each side thereof in a right-left direction, the engagement piece is provided on each side of the other one of the housing portion or the cover portion in the right-left direction, and is configured to be fitted in the engagement groove in a state of the housing opening being closed with the cover portion, the engagement groove has a first inner end surface and a second inner end surface, the first inner end surface is positioned on a front side of the engagement groove, and the second inner end surface is positioned on a back side of the engagement groove, the engagement piece has a first outer end surface and a second outer end surface, the first outer end surface is positioned on a front side of the engagement piece, and the second outer end surface is positioned on a back side of the engagement piece, at least the second inner end surface of the first and second inner end surfaces is an inner inclined surface inclined backward from up to down, at least the second outer end surface of the first and second outer end surfaces is an outer inclined surface inclined backward from the up to the down, and in a state of the housing opening being closed with the cover portion, at least a lower portion of the inner inclined surface of the second inner end surface and a lower portion of the outer inclined surface of the second outer end surface contact each other.

2. The housing according to claim 1, wherein the attachment structure further has a latching hole and a latching claw, the latching hole is formed in either one of the engagement groove or the engagement piece, the latching claw protrudes from the other one of the engagement groove or the engagement piece, and in a state of the housing opening being closed with the cover portion, the latching claw is hooked on an edge portion of the latching hole.

3. The housing according to claim 2, wherein the latching hole and the latching claw are hooked on each other at a position shifted forward with respect to a center of the engagement groove in a front-back direction.

4. The housing according to claim 2, wherein either one of the edge portion of the latching hole or a latching surface of the latching claw to be hooked on the edge portion of the latching hole is inclined with respect to the other one of the edge portion or the latching surface such that a front portion of the edge portion of the latching hole and a front portion of the latching surface of the latching claw contact each other and a back portion of the edge portion of the latching hole and a back portion of the latching surface of the latching claw are apart from each other.

5. The housing according to claim 1, wherein an inclination angle of the outer inclined surface of the engagement piece with respect to an up-down direction is greater than an inclination angle of the inner inclined surface of the engagement groove with respect to the up-down direction.

6. The housing according to claim 1, wherein each of the first and second inner end surfaces of the engagement groove has the inner inclined surface, and the inner inclined surface of the first inner end surface and the inner inclined surface of the second inner end surface are formed parallel with each other, each of the first and second outer end surfaces of the engagement piece has the outer inclined surface, and the outer inclined surface of the first outer end surface and the outer inclined surface of the second outer end surface are formed parallel with each other, and when the housing opening is closed with the cover portion, the engagement piece enters the engagement groove while the outer inclined surface of the first outer end surface of the engagement piece is contacting an upper portion of the inner inclined surface of the first inner end surface of the engagement groove.

7. A connector comprising:

the housing according to claim 1; and a crimp terminal, wherein the crimp terminal has a crimp portion and a terminal connection portion, and is housed in the housing chamber of the housing, the crimp portion is configured to extend backward, and be crimpable to a tip end portion of a cable, and the terminal connection portion is provided so as to extend downward from the crimp portion.

* * * * *